US010742508B2

(12) United States Patent
Oksman et al.

(10) Patent No.: US 10,742,508 B2
(45) Date of Patent: Aug. 11, 2020

(54) CUSTOMER BANDWIDTH RE-DISTRIBUTION IN POINT-TO-MULTIPOINT ACCESS

(71) Applicant: Intel Corporation, Santa Clara, CA (US)

(72) Inventors: Vladimir Oksman, Morganville, NJ (US); Rainer Strobel, Munich (DE)

(73) Assignee: Intel Corporation, Santa Clara, CA (US)

( * ) Notice: Subject to any disclaimer, the term of this patent is extended or adjusted under 35 U.S.C. 154(b) by 8 days.

(21) Appl. No.: 16/146,288

(22) Filed: Sep. 28, 2018

(65) Prior Publication Data

US 2019/0044813 A1 Feb. 7, 2019

Related U.S. Application Data

(60) Provisional application No. 62/635,787, filed on Feb. 27, 2018.

(51) Int. Cl.
*H04L 12/24* (2006.01)
*H04L 12/923* (2013.01)
(Continued)

(52) U.S. Cl.
CPC ......... *H04L 41/0896* (2013.01); *H04B 3/487* (2015.01); *H04L 1/0009* (2013.01);
(Continued)

(58) Field of Classification Search
CPC ............... H04L 41/0896; H04L 25/022; H04L 25/0226; H04L 43/10; H04L 25/0224;
(Continued)

(56) References Cited

U.S. PATENT DOCUMENTS

| 4,768,188 A | * | 8/1988 | Barnhart | .................. H04J 3/08 |
| | | | | 370/434 |
| 5,491,837 A | * | 2/1996 | Haartsen | ............. H04W 52/242 |
| | | | | 455/62 |

(Continued)

FOREIGN PATENT DOCUMENTS

EP 0930800 A2 7/1999

OTHER PUBLICATIONS

Extended European Search Report for European Patent Application 19153625.9 dated Sep. 30, 2019.
(Continued)

*Primary Examiner* — Michael Won
(74) *Attorney, Agent, or Firm* — 2SPL Patent Attorneys PartG mbB

(57) ABSTRACT

A system for redistributing bandwidth among a plurality of customer premises equipments (CPEs), wherein each of the plurality of CPEs have an initial bandwidth allocation, comprises a distribution point unit (DPU). The DPU is configured to detect an excess available bandwidth condition of one of the plurality of CPEs, detect a need for additional bandwidth condition of another one of the plurality of CPEs, communicate a bandwidth re-allocation request and a set of granted tones to the CPE having the detected excess available bandwidth condition and to the CPE having the detected additional bandwidth condition, and communicate a time instant at which the set of granted tones should be switched from the CPE having the detected excess available bandwidth condition to the CPE having the detected additional bandwidth condition.

26 Claims, 13 Drawing Sheets

(51) Int. Cl.
*H04L 12/761* (2013.01)
*H04L 1/00* (2006.01)
*H04L 25/02* (2006.01)
*H04L 12/26* (2006.01)
*H04B 3/487* (2015.01)

(52) U.S. Cl.
CPC ........ *H04L 25/022* (2013.01); *H04L 25/0224* (2013.01); *H04L 25/0226* (2013.01); *H04L 43/10* (2013.01); *H04L 45/16* (2013.01); *H04L 47/762* (2013.01); *H04L 43/0882* (2013.01); *H04L 2001/0093* (2013.01)

(58) Field of Classification Search
CPC ..... H04L 1/0009; H04L 45/16; H04L 47/762; H04L 43/0882; H04L 2001/0093; H04B 3/487
See application file for complete search history.

(56) References Cited

U.S. PATENT DOCUMENTS

| | | | | |
|---|---|---|---|---|
| 5,729,607 | A * | 3/1998 | DeFries | H04B 1/69 375/254 |
| 5,745,837 | A * | 4/1998 | Fuhrmann | H04B 1/707 348/E7.07 |
| 5,987,061 | A * | 11/1999 | Chen | H04L 1/0003 375/222 |
| 6,865,232 | B1 * | 3/2005 | Isaksson | H04L 1/0025 375/260 |
| 9,839,035 | B2 * | 12/2017 | Madan | H04W 16/10 |
| 2003/0099208 | A1 * | 5/2003 | Graziano | H04L 1/0001 370/286 |
| 2005/0048985 | A1 * | 3/2005 | Haartsen | H04W 72/0446 455/453 |
| 2005/0265255 | A1 * | 12/2005 | Kodialam | H04L 45/04 370/252 |
| 2007/0247936 | A1 * | 10/2007 | Direnzo | G06F 12/0284 365/200 |
| 2009/0110087 | A1 * | 4/2009 | Liu | H04L 1/0021 375/260 |
| 2009/0193485 | A1 * | 7/2009 | Rieger | H04N 21/2402 725/114 |
| 2010/0150285 | A1 * | 6/2010 | Tazebay | H04B 1/7097 375/346 |
| 2010/0202281 | A1 * | 8/2010 | Kramer | H04L 25/0224 370/201 |
| 2010/0202554 | A1 * | 8/2010 | Kramer | H04L 25/0224 375/285 |
| 2011/0110661 | A1 * | 5/2011 | Grubor | H04B 10/1143 398/38 |
| 2012/0137319 | A1 * | 5/2012 | Schooling | H04H 20/40 725/16 |
| 2012/0189072 | A1 * | 7/2012 | Tzannes | H04L 25/0226 375/260 |
| 2013/0051230 | A1 * | 2/2013 | Bareis | H04L 12/2801 370/230 |
| 2013/0117766 | A1 * | 5/2013 | Bax | G06F 9/4405 719/323 |
| 2013/0208579 | A1 * | 8/2013 | Strobel | H04B 3/32 370/201 |
| 2014/0153630 | A1 * | 6/2014 | Strobel | H04L 1/0001 375/229 |
| 2015/0215059 | A1 * | 7/2015 | Kerpez | H04M 11/062 379/406.01 |
| 2019/0044813 | A1 * | 2/2019 | Oksman | H04L 41/0896 |

OTHER PUBLICATIONS

Partial European Search Report for European Patent Application 19153625.9 dated Jun. 24, 2019.

* cited by examiner

CUSTOMER BANDWIDTH RE-DISTRIBUTION IN POINT-TO-MULTIPOINT ACCESS

REFERENCE TO RELATED APPLICATIONS

This application claims the benefit of U.S. Provisional application No. 62/635,787 filed Feb. 27, 2018, entitled "CUSTOMER BANDWIDTH RE-DISTRIBUTION IN POINT-TO-MULTIPOINT ACCESS", the contents of which are all herein incorporated by reference in their entirety.

FIELD

The present disclosure relates to home networking architectures and methods for customer bandwidth re-distribution in point-to-multipoint access.

BACKGROUND

Modern wired access systems can bring a huge bandwidth to premises. Distribution of this bandwidth inside the premises is necessary and WiFi is currently the main and the most popular network providing bandwidth distribution within premises. Unfortunately, WiFi connectivity and transport capability depends on the type of premise: in big premises or premises with concrete or brick internal walls, the capacity of WiFi channels is substantially reduced and service delivery with high quality of service (QoS) may become problematic.

WiFi operation can be improved by using multiple WiFi access points (APs) connected to the residential gateway by wired lines. This connection is a popular application for wired home networking system, such as HomePlug, MoCA, or G.hn. However, in case of wide-bandwidth access systems operating over phone wires, use of wireline home networking systems is often not possible because mutual interference between the in-home system operating over phone line or power line and access system, also using phone line. And a typical residence in many regions has only two media types: phone wiring and power line, which often have rather substantial mutual crosstalk. This crosstalk can be mitigated on low frequencies, as defined in ITU-T G.9977, but it doesn't work efficiently for system with wider transmission spectrum, such as G.fast and MGfast. Besides, the capacity of power lines is often low and even connection to some points is not possible.

Another way is to connect the WiFi AP directly to the access system. In modern access systems, such as MGFAST, a modem at the distribution point unit (DPU) may be connected to multiple CPEs in the premises, forming point-to-multipoint connection (P2MP). Each CPE, in turn, may be equipped with a WiFi AP.

This bandwidth distribution architecture is indeed powerful, since it allows to allocate multiple WiFi APs in different places of the premise, thus avoiding loss of bandwidth due to poor WiFi signal propagation. However, to work efficiently, it is necessary to re-distribute bandwidth between the connected CPEs in timely manner, to avoid big chunks of unused bandwidth allocated for the CPEs that are currently not in use.

DETAILED DESCRIPTION

Figure 1:
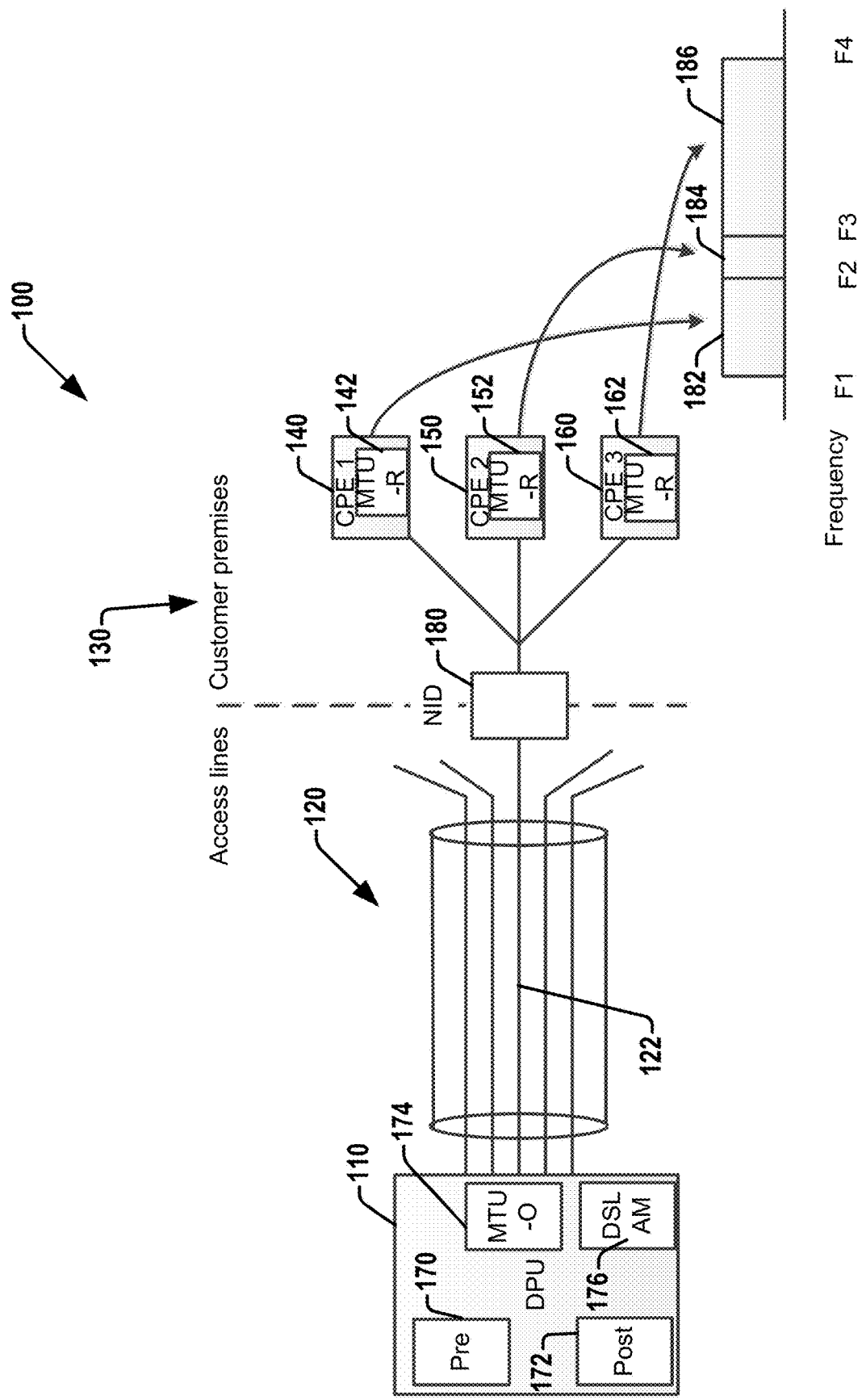
FIG. 1 is a block diagram illustrating a point to multipoint customer access system or device according to various aspects (embodiments) described.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (UE) (e.g., mobile/wireless phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

In consideration of described deficiencies of in-home networking systems current in-home networking systems implement bandwidth re-distribution between network nodes by using packet-based transmission, such as each packet sent includes an address of the network node(s) to be transmitted to and received at.

Another way of bandwidth distribution is by assigning transmission/reception time intervals for each CPE, such as in passive optical networks (PON). With this, the total transmission time of the transmission head-end is distributed between multiple ONUs or broadcast transmission is used, while each ONU is assigned a transmission interval. The size of this interval can be negotiated and re-configured by the management system. Generally, this is a time division multiple access (TDMA), which may be applied per each used wavelength.

Another way of bandwidth distribution is assignment to each CPEs of a particular set of frequencies, so that the CPE uses these frequencies for transmission and reception. The particular frequency band for each CPE can be configurable, so it can be adjusted if a demand for bandwidth in one CPE decreases, which can be a part of frequency division multiple access (FDMA).

A combination of TDMA and FDMA (TFDMA) is also possible: during the certain transmission time interval, one group of CPEs can operate using a different frequency band each, while during another transmission time interval these or different frequency bands can be used by other CPEs.

Embodiments or aspects herein address the case of FDMA and, consequently, TFDMA, and provides solution to the problem bandwidth re-distribution by pre-evaluation (completely or partially) for each related CPE, the direct channel and the crosstalk channel (or lines connected to other CPEs potentially causing crosstalk interference) on the tones (e.g., carriers or sub-carriers) used for other CPEs (all other CPEs or selected set of other CPEs). As a result, in the time a bandwidth re-distribution is requested, a CPE can be prepared to receive a set of tones used by another CPE and the DPU can be already configured to receive a certain set of other tones from a different CPE.

In an embodiment, the time for channel evaluation can be reduced by sending more training symbols during a transition period.

Further embodiments, utilize partial re-distribution of bandwidth, allowing all CPEs staying active all the time, while some use only very small bandwidth to support occasional service requests.

Additional aspects and details are further described below with reference to figures.

Referring now to FIG. 1, illustrated is an exemplary embodiment of a vectored transmission system 100 that in part, or whole, can be utilized in accordance with various embodiments herein. Exemplary embodiments/aspects herein can be described with respect to as a G.fast or MGfast system, for example. It is to be noted however that the vectored transmission system is only an exemplary embodiment of a vectored transmission system and that vectored transmission system 100 can be of any other type. Furthermore, it is intended that the lines of the vector transmission system are only one representation of channels of a vectored transmission system and that the described lines may be replaced in other embodiments by other communication channels.

An access line 120 coming from a distribution point unit (DPU) 110 splits at a customer premise 130, and is connected to one or more CPEs 140, 150, or 160 (e.g., a home gateway, router, user equipment, internet of things (IoT) device, or the like), which are not necessarily limited to any specific number herein. The DPU 110 feeds a number of premises, and far-end crosstalk (FEXT) between the lines sourced from the DPU 110 is cancelled by a pre-coder component 170 and a post-coder component 172, in which both are integrated in, comprised by, or communicatively coupled to the DPU 110. The DPU 110 can also include one or more processors, represent one or more processors, controllers or microcontrollers of a network device or circuitry, or other component for enabling one or more aspects of embodiments herein.

The access line 120 connects the CPEs 140 thru 160 with a twisted pair 122 having direct lines corresponding to each CPE 140-160 through (via) a network interconnect/interface device (NID) 180.

Transceiver(s) (Tx) 174 of the DPU 110 serving the access line 120 can be further denoted as MTU-O for the operating side, and the transceivers 142, 152, 162 of CPEs 140, 150, 160, respectively, can be denoted as MTU-Rs (e.g., referring to MGFAST technology).

Each of the CPEs 140-160 can utilize a particular set of frequencies (182, 184, 186), which shown in FIG. 1 are three, non-overlapped, parts of frequency spectrum from F1 to F2, F2 to F3, and F3 to F4. With various embodiments herein, the sets of frequencies used by each CPE can be any. With multi-carrier modulation, like Discrete Multi-Tone (DMT) or Orthogonal Frequency Division Multiplexing (OFDM), each set of frequencies 182, 184, 186 can be utilized by associated set of frequency carriers (also called tones, carriers or subcarriers).

A main characteristic function of the vector transmission system 100 is to utilize crosstalk cancellation (vectoring) between lines (twisted pairs) of the access lines binder 120, sourced from the DPU 110. Various aspects or embodiments described herein support full duplex (FDX) operation, in which local echo can be cancelled in the DPU 110 and in each CPE 140, 150, 160, and Near-End Crosstalk (NEXT) is cancelled in the DPU 110 and mitigated in the CPEs 140-160 at the customer premises.

NEXT, as referred to herein, occurs when a strong signal transmitted over one line (one twisted pair of wires) is picked up by an adjacent line (twisted pair of wires), resulting in a portion of a transmitted signal being electromagnetically coupled back into the received signal.

The vector transmission system 100 can also comprise other components (not shown) that are a part of or operable coupled to the vectoring transmission system 100. In one example, a Digital Subscriber Line Access Multiplexer (DSLAM) 176 can operate to combine a plurality of transceivers 174 at the DPU 110, which can also be coupled to a plurality of lines of the access line 120. Each of the lines of the plurality of lines may for example be implemented as a twisted pair wire as the access line 120.

Each of the plurality of lines 122 of access line 120 can connect one or more transceivers 174 at the operator's end with a respective second transceiver unit 142-162 at a subscriber or CPE end, which can be at different distances with respect to one another. The DPU 110 can comprise or operate as a management entity to provide management functions such as spectrum management and coordination functionality for transmitting FEXT probing signals or other signal communication operations according to various embodiments/aspects described herein.

Figure 2:
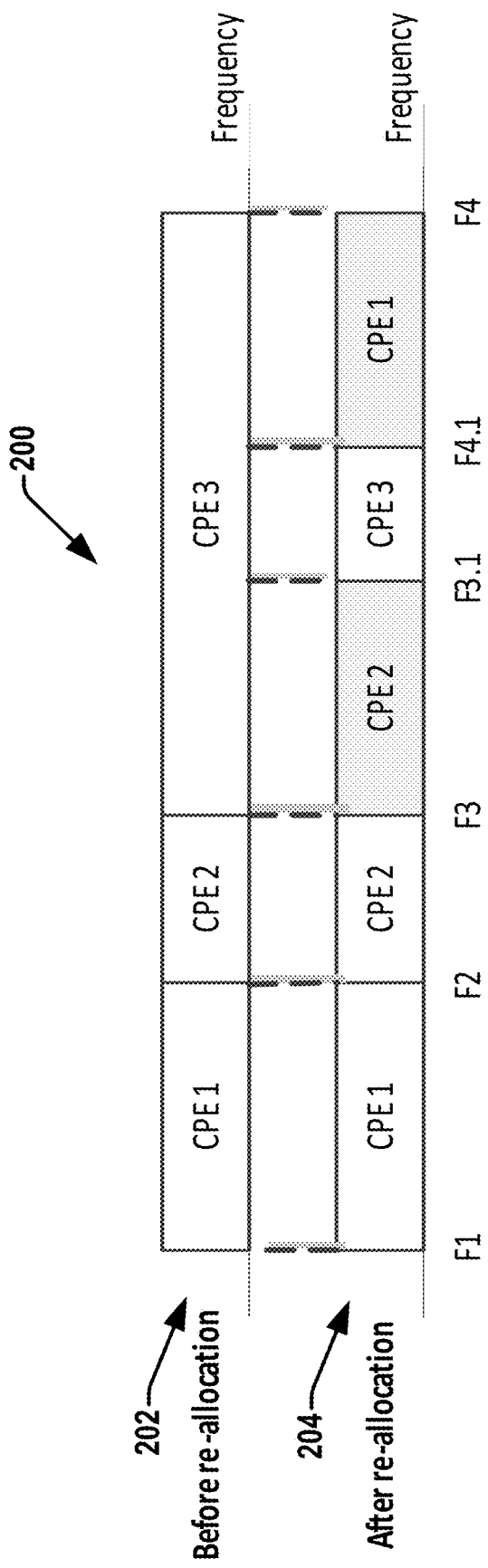
FIG. 2 is an example diagram illustrating a bandwidth re-distribution according to various aspects described.

Referring to FIG. 2, illustrated is an example of bandwidth re-distribution/re-allocation 200 between CPEs in accordance with various embodiments. The DPU 110 and CPEs 140-160 can operate to enable bandwidth re-distribution independently in the downstream or downlink (DL) only, independently in the upstream or uplink (UL) only, both UL/DL concurrently, or both UL and DL at the same time.

The bandwidth re-distribution (re-allocation) can be a procedure when tones used by one CPE are taken and granted for use to another CPE or CPEs. The CPE that tones are taken from can be referred to as a tributary CPE, while the CPEs that receive the tones for use can be further referred to as beneficiary CPE(s). An example of bandwidth re-distribution for the three CPEs 140, 150, and 160 is illustrated by FIG. 2.

For example, before re-allocation at 202, the initial band allocation in frequency for CPE 1, CPE 2, and CPE 3 as CPEs 140, 150, 160, respectively, are illustrated. After re-distribution at 204, CPE 3 (e.g., CPE 160) is determined by the DPU 110 as having an excess of bandwidth that is able to be available because it is not in use. The DPU 110 detects a need for or for more bandwidth by at least one other CPE (e.g., CPEs 140 and 150), which can be based on a request, a rate of UL data or DL data, an application being executed, or other basis. In response to a deficiency or need of at least one CPE and an excess or available bandwidth from another CPE being detected, the DPU 110 can initiate a re-distribution of bandwidth from the tributary CPE 160 to beneficiary CPE(s) CPE 2 or CPE 1 accordingly. In this manner, frequency bands and their assignments can be altered dynamically by being re-allocated at any one time based on changes needs and available resources at a customer premises via a twisted wire for a home network. The DPU 110 is thus configured to change at least a part of a bandwidth of one CPE (e.g., CPE 160) at one location to another CPE (e.g., CPE 140 or 158) within a same customer premises.

Figure 3:
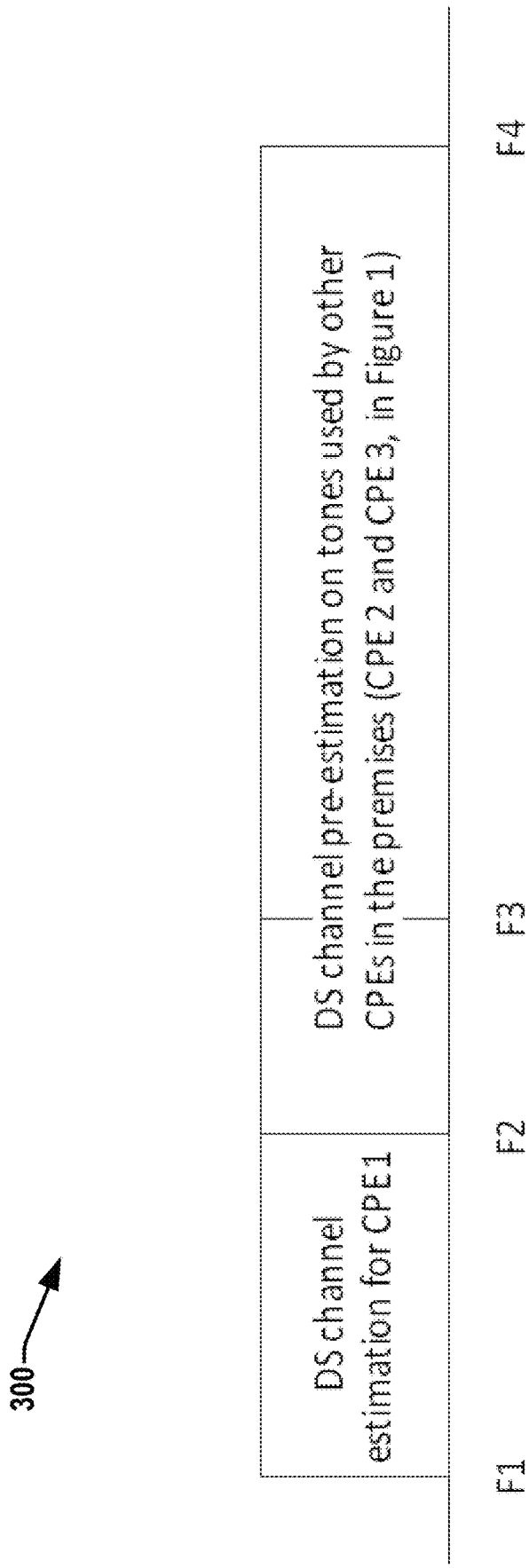
FIG. 3 is an example diagram illustrating a bandwidth re-distribution operation for a downstream channel estimation according to various aspects described.

Referring to FIG. 3, illustrated is an example of bandwidth re-distribution/re-allocation 300 operation between CPEs with downstream or DL channel estimation in accordance with various embodiments. In the re-distribution 300 for downstream estimation, the MTU-O transmitter 174, for example, is configured by the DPU 110 to send a probe symbol that comprises tones used by all active CPEs 140-160, and every tone can be modulated by a probe sequence. Different tones in a probe symbol of a probe signal can be modulated by the same probe sequence bit, or different tones or groups of tones can be modulated by bits of different probe sequences. Probe sequences used in different lines can be orthogonal or pseudo-orthogonal, in which Walsh-Hadamard sequences are one example of orthogonal probe sequences that can be used by the DPU 110 for generating the probe sequences to be sent to the CPEs 140-160, for example.

The MTU-R transceivers 142, 152, 162 at all CPEs 140-160 can receive all of the tones of the probe signal, compute the receive signal of a direct channel (or line between the DPU 110 and a particular CPE 140-160) and the error caused by a crosstalk channels (e.g., channels through which other CPE(s) cause crosstalk). Each CPE 140-160 sends that computed error and measured signal attenuation (either the measured signal itself or the difference between the measured signal and the known transmitted signal) back to the MTU-O 174 over one of the management channels (e.g., via an embedded operations channel (EOC)), for example.

FIG. 3 illustrates in particular an example of channel estimation in CPE 1 (e.g. CPE 140) that operates on frequencies F1 to F2: CPE 1 (e.g., CPE 140) does channel estimation on its own tones at frequencies F1-F2 of the probe signal and does channel pre-estimation on frequencies used by other CPEs (e.g., CPE 150, 160), which are F2-F4. The downstream probe sequences can contain +1, −1, and zero elements. Sending zero elements on particular tones of particular lines provides zero transmission power on these tones in these lines, which allows to exclude crosstalk generated by these lines on these tones. This helps to improve the accuracy of the direct channel estimation by enabling these operations via the DPU 110, for example. As such, each of the CPEs can use the tones of the probe to generate a channel estimation on its own direct channel, and a pre-estimation of tones on other channels based on a zeroing of other lines or channels, either concurrently, consecutively or intermittently within an estimation period, for example.

All MTU-Os 174 on all lines of the vectored group can be used to send probe symbols synchronously, so that all CPEs 140-160 can receive them at the same time (with the accuracy associated with or commensurate with the propagation delay) as all other CPEs, connected to different lines of the line binder 120. The impact of propagation delay can be mitigated by selection of an appropriate cyclic extension in the symbols used for communication.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 4:
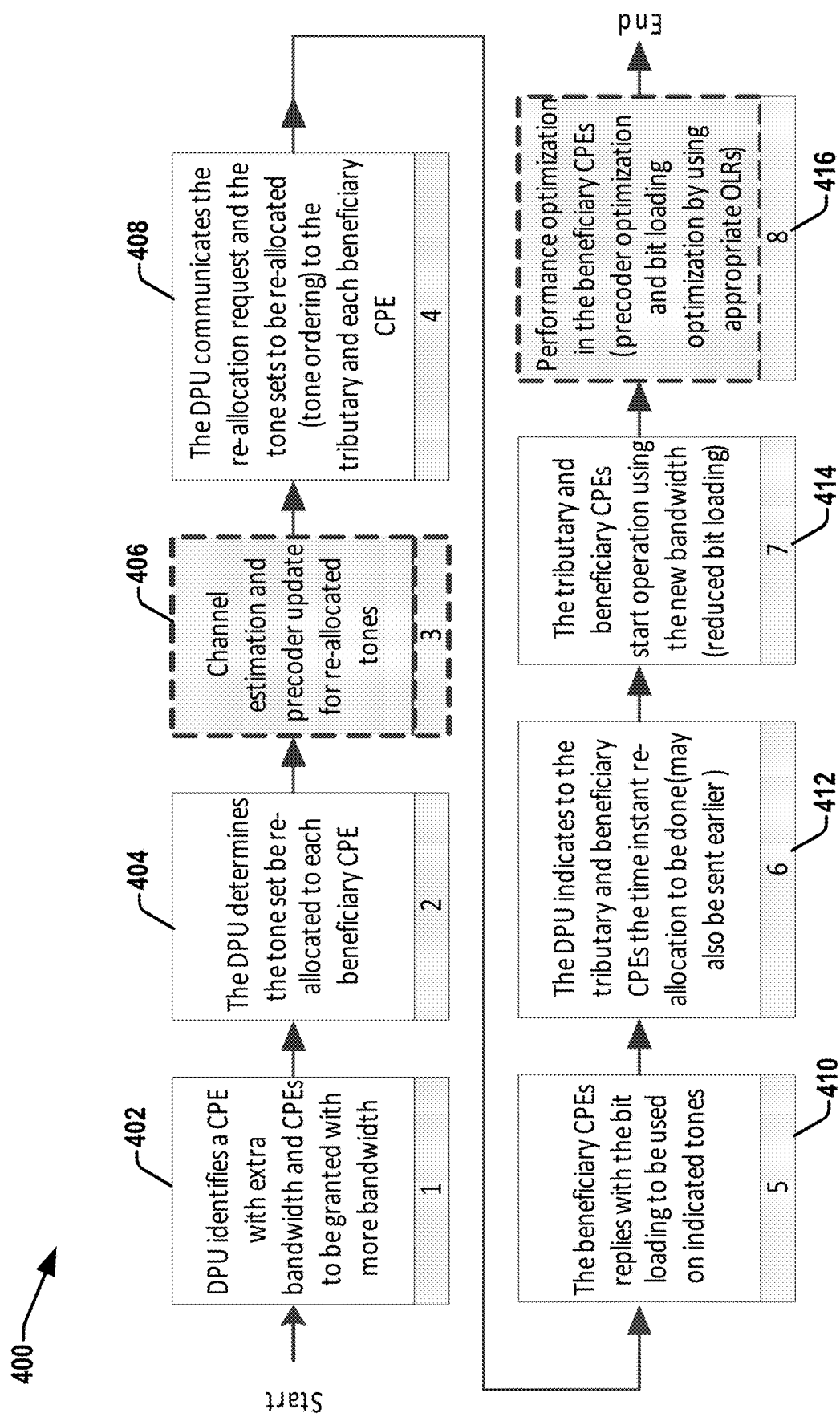
FIG. 4 is an example diagram illustrating a bandwidth re-distribution procedure according to various aspects described.

Referring to FIG. 4, illustrated is an example of a downstream bandwidth re-distribution process flow 400 in accordance with various embodiments. Bandwidth re-distribution from one CPE (e.g., CPE 140) to another (e.g. CPE 160) can include one or more acts, in different orders as disclosed herein.

At 402, the process flow 400 includes initiating the bandwidth re-distribution procedure by the DPU 110 after the DPU 110 detects (with assistance of the CPEs 140-160, connected in customer premises, or without such assistance) that one of the CPEs (e.g., CPE-n, CPE 140, or any other CPE in the customer premises) has insufficient downstream bandwidth while one or more other CPEs (e.g., CPE 160) has excessive downstream bandwidth, which may benefit the CPE with insufficient bandwidth.

In some embodiments, a CPE 140 can be configured to predict the required downstream data rate in advance, because, for example, a certain service is requested by the user or an application to be executed by the user. Then, the CPE 160 can inform the DPU 110 on the required increase of the downstream data rate can be requested from other CPEs (e.g., from CPE 160 that reports excessive data rate can be requested from other CPEs, e.g., from CPE 160 that reports excessive data rate, and thus be available at a time when the mentioned service/application is requested.

At 404, the DPU 110 selects one or more of CPEs (e.g., 140, 150) (CPE-k, CPE-m) to be granted additional bandwidth by re-allocation parts of the bandwidth from CPE-n 160. The DPU 110, using the results of channel estimation provided by CPE-k, CPE-m 140, 150 (specifically, the direct channel estimation) identifying the set of tones to be re-assigned from tributary CPE-n 160 to each beneficiary CPE 140, 150, for example.

At 406, a channel estimation and update of the precoder for the re-allocated tones is performed.

At 408, the DPU 110 is configured to communicate the bandwidth re-allocation request and the selected set of granted tones to tributary CPE (CPE-n) 160 and to the beneficiary CPEs (CPE-k, CPE-m) 140, 150 via one or more corresponding management channel(s).

The beneficiary CPEs 140, 150 are then triggered in response to compute the bit loadings on these tones using the currently measured channel quality measurement (e.g., a signal to noise ratio (SNR)) and indicates these bit loadings to the DPU 110 in a reply at 410.

At the 412, the DPU 110 also indicates the time instant at which the tones should be switched to beneficiary CPEs 140, 150 (e.g., in a bandwidth re-allocation request, or in a reply to the bit loading proposals from the beneficiary CPEs). From this time instant, at 408, the DPU 110 loads on the granted tones the data that belongs to the beneficiary CPEs 140, 150 and the beneficiary CPEs 140, 150 then start reception of data on the granted tones based on the re-distribution/re-allocation. An Indication of the time instant can be generated by the DPU 110 by sending the frame count, superframe count, or any other relevant time count that is synchronized between the MTU-O 172 and MTU-Rs 142-162. This count can be sent over the most robust of the management channels, for example, based on a measurement of signal quality or estimation thereof.

At 414, from the moment beneficiary CPEs 140, 150 receive indication of the granted tones from the DPU 110, each of them can synchronize on the indicated granted tones. If the DPU 110 decides to modify the transmit power spectrum density (PSD) of these tones, it may speed up the synchronization process of the CPEs by sending the required relative changes in the receiver gain, associated with changes of the PSD, to the corresponding CPE 140-160. These changes have to be applied upon transitioning to the new bandwidth.

At 416, after bandwidth is granted, the beneficiary CPE 140, 150 may improve performance in the new assigned bandwidth or in overall bandwidth using regular means of on-line reconfiguration (OLR).

In some embodiments for downstream bandwidth re-distribution in one line, there is no need to modify the transmit downstream signal in this line. If no modifications of impedance occur in the CPEs 140-160, no changes are expected in the crosstalk channel from this line into all other lines. Therefore, CPEs in all other lines that use re-allocated bandwidth can be expected to operate normally, with no performance degradation.

However, pre-compensation signals in a line subject to bandwidth re-distribution may not be suitable for the beneficiary CPEs (e.g., 140, 150). In the described process flow 400, these signals can be updated after new bandwidth is granted at 416. Updating these signals after re-distribution can substantially reduce the bandwidth re-distribution time, but the performance of beneficiary CPEs over new granted tones may be sub-optimal prior to this update.

In another embodiment, which is less sensitive to re-distribution time, the downstream channel estimation can be performed, and precoder 170 can be updated, prior to the bandwidth re-allocation request being communicated by the DPU 110 at 406.

In aspects/embodiments related to partial full duplex operation, when full duplex is not used on tones in the line that is subject for bandwidth re-distribution, but full duplex may be used on these tone by other lines of the access line 122, the beneficiary CPE 140, 150 or receiver 142, 152 of the CPE 140, 150 can operate to mitigate NEXT from other lines at the granted tones. This can be done prior to bandwidth re-allocation, although NEXT mitigation may be subject to further adjustment of the transmission levels of CPEs in other lines. This adjustment, same as the precoder adjustment, can be done at 406 (if re-allocation time sensitivity is low) or at act 416 of FIG. 4 (if re-allocation time sensitivity is high) as part of the process flow 400.

In an aspect, when full duplex is to be utilized on granted tones, the beneficiary CPE 140, 150 or its transceiver 142, 152 can cancel echo on granted tones (since granted tones are also used for transmission in upstream). For this echo cancellation operation, an echo canceler (not shown) or echo cancelation component of the beneficiary CPE 140, 150 can be trained on the granted tones during the probe signals (while the tributary CPE 160 stops upstream transmission on the granted tones in probe signals). To improve the speed of retraining, the DPU 110 may send zero elements on the granted tones during the probe symbols. Other symbol positions that are not used for downstream transmission on granted tones by other lines can be also used for training of the echo canceller if quiet symbols are sent on these positions in the downstream on other lines; these positions can be known to the CPE 140, 150, for example.

Figure 5:
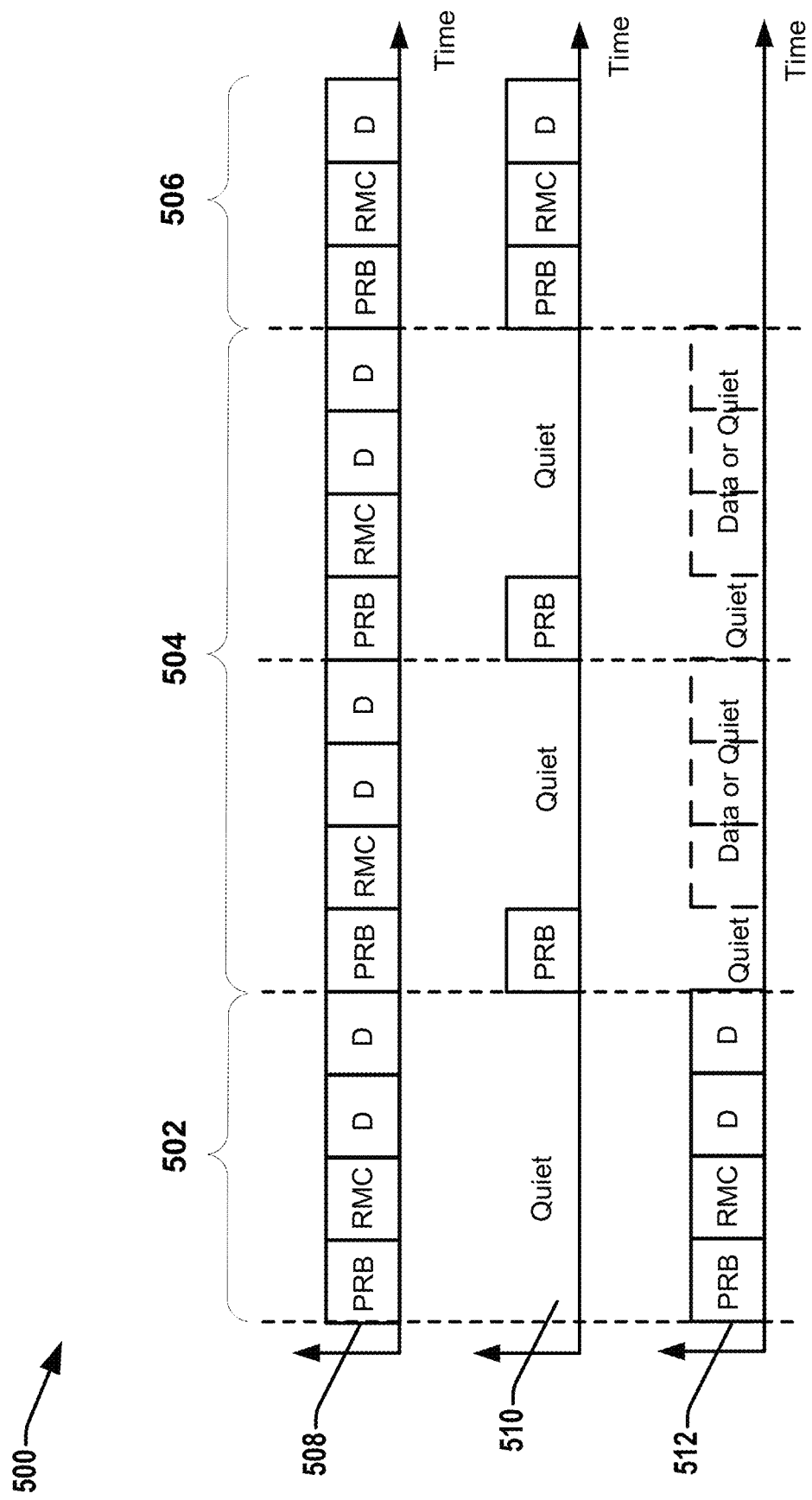
FIG. 5 is a block diagram of probe and data symbols along lines during re-distribution on granted tones in accordance with various aspects described.

Referring to FIG. 5, illustrated is an example of communications 500 including probe and data symbols during a re-allocation/re-distribution being performed on granted tones in accordance with embodiments. In this example, communications 512 correspond to the tributary CPE 160. Communications 510 correspond to a beneficiary CPE (e.g., 140) and communications 508 correspond to another CPE 150, each with a different associated direct line of the access line 122 than other CPEs. Note, that FIG. 5 illustrates only tones that are subject for bandwidth re-distribution; other tones of all CPEs continue performing normally. Progression along the horizontal time line of the communications 500 illustrates different phases 502, 504, 506 of the re-distribution or re-allocation. These include an initial tone allocation 502, channel estimation on re-allocated tones and equalizer training 504, and a new tone allocation with granted tones 506. Each block can represent a symbol as either a probe symbol or a data symbol. For example, the symbols of communication symbols can include a sync symbol or probe symbol (PRB), a robust management channel (RMC), and a user data (D) with each symbol designated accordingly in FIG. 5.

In contrast to the downstream operations of re-distribution, channel pre-estimation in the upstream is only relevant for the direct channel because switching the bandwidth from one CPE 160 to another CPE 140 can result in a substantial increase of residual upstream crosstalk into other lines because transmission of a particular set of frequencies occurs from a different CPE. In principle, the crosstalk channel for each upstream tone being used by each combination of CPEs (e.g., 150 and 160, or any other combination of any number of CPEs also communicatively coupled via the access line 122) can be pre-estimated and stored at the DPU 110; however, the number of crosstalk channel matrices to be stored equals the number of combinations of CPEs connected to all lines of the vectored group or access line 122. Storage of such a large amount of data seems can be impractical. In case it is needed so, in upstream re-distribution only the direct channel or crosstalk channel (i.e., lines of other CPEs potentially causing crosstalk interference) between a selected subset of CPEs can be pre-estimated.

In an aspect, upstream crosstalk channel estimation can be only performed during the bandwidth re-distribution procedure or a time period designated for re-allocation; accordingly, the duration of bandwidth distribution procedure could increase. This increase depends upon how the channel estimation is specifically performed. As such, three different types (cases) of upstream channel re-allocation techniques are envisioned, which can differ by the channel estimation method and thus, bandwidth re-distribution time.

In a first example embodiment, a channel estimation can be performed as a part of bandwidth re-allocation with regular probe symbols comprising loaded probe sequences. In this case, the bandwidth re-distribution procedure is initiated by the DPU 110 after the DPU 110 detects (with assistance of the one or more CPEs 140-160, or without it) that one or more other CPEs 140 needs more upstream bandwidth, while one of the CPEs 160 (CPE-n) or more has excessive upstream bandwidth. At times the CPE (e.g., 140 or 160) may be able to predict the desired upstream data rate in advance and indicate such to the DPU 110 for bandwidth re-allocation. For example, the new data rate can be signaled in response to a certain service, quality of service, signal/channel SNR, or the like being requested by the user or user application of the CPE. Then, the CPE 140-160 can inform the DPU 110 on the required increase or decrease of the upstream data rate, accordingly, so that appropriate upstream data rate is available at a particular time, as indicated in the request or predefined.

At 502, for example, the tributary CPE communications 512 of tributary CPE 160 initiate with an initial bandwidth allocation. At 504, re-allocation is initiated or triggered (e.g., via the DPU 110, or by CPE 140) and data symbols can communicate at this time at the portions of the bandwidth to be re-distributed or the carriers could be quiet without activity. At 506, after the new tones or portions of bandwidth are re-allocated to the beneficiary CPE 140, nothing is further communicated on this bandwidth by the tributary CPE 160. Likewise, at the beneficiary CPE 140 and in phase 502 nothing is communicated on the portions to be re-distributed to it, and at 504, once re-distribution has initiated only the probe symbol are used for channel estimation on this tone or subcarrier part while other portions of the bandwidth to be re-allocated are quiet or unused. As such, while the tributary CPE 160 communicates data only on the portions of bandwidth being re-allocated, the beneficiary CPE 140 communications according to the probe symbol on the portion being re-allocated. Other lines such as with CPE 150 can be used as usual or based on a power condition being signaled for determining cross talk as a crosstalk channel relative to the beneficiary CPE 140, for example.

Figure 8:
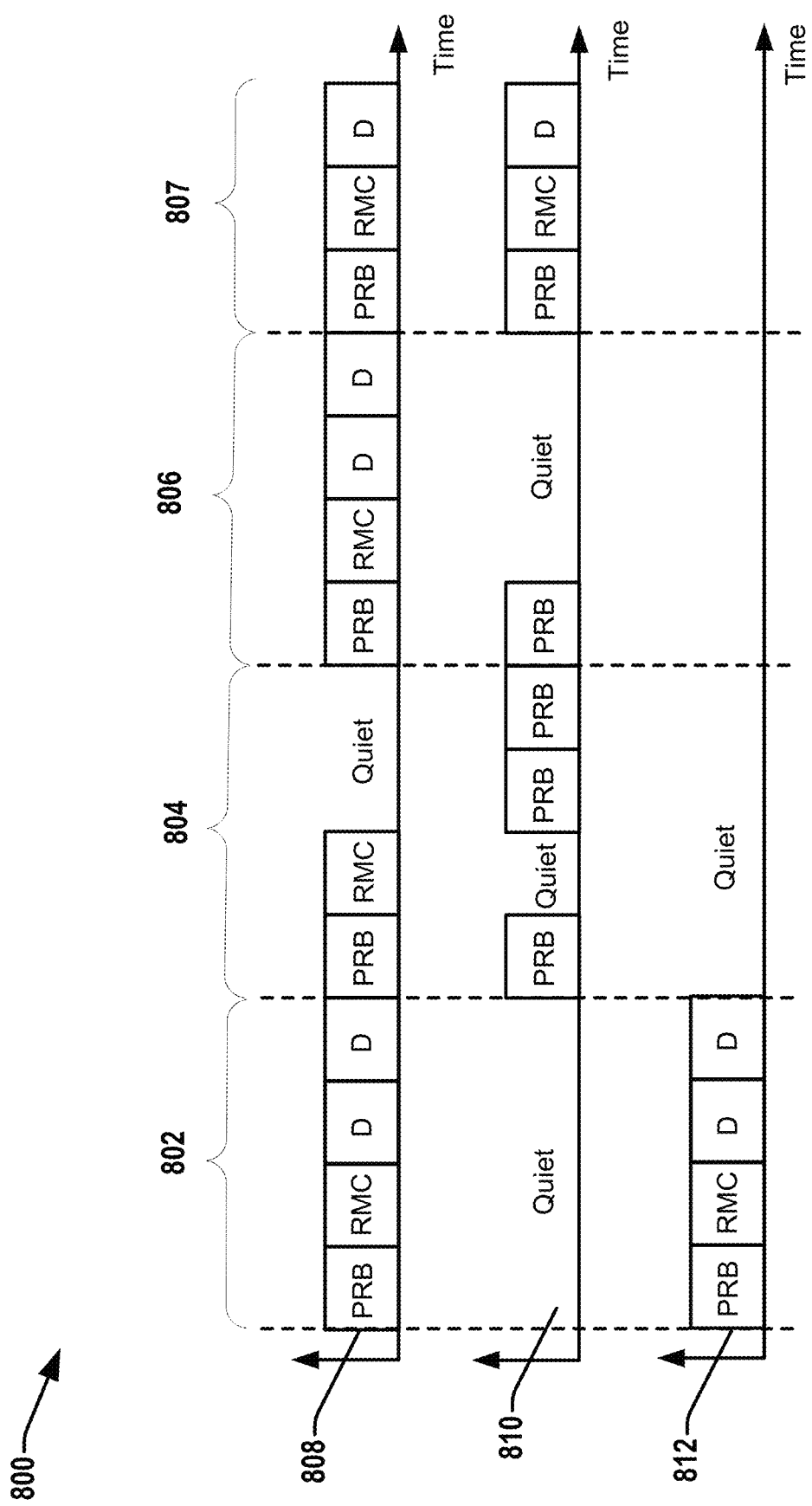
FIG. 8 is another block diagram of probe and data symbols along lines during re-distribution on granted tones in accordance with various aspects described.

In a second example embodiment, as further described infra with respect to FIG. 8, an accelerated channel estimation can be utilized as a part of the bandwidth re-allocation. The accelerated channel estimation can include many or even all data symbol positions being used to carry probe sequences in order to reduce the required time of transmission with respect to the first example embodiment above.

Figure 9:
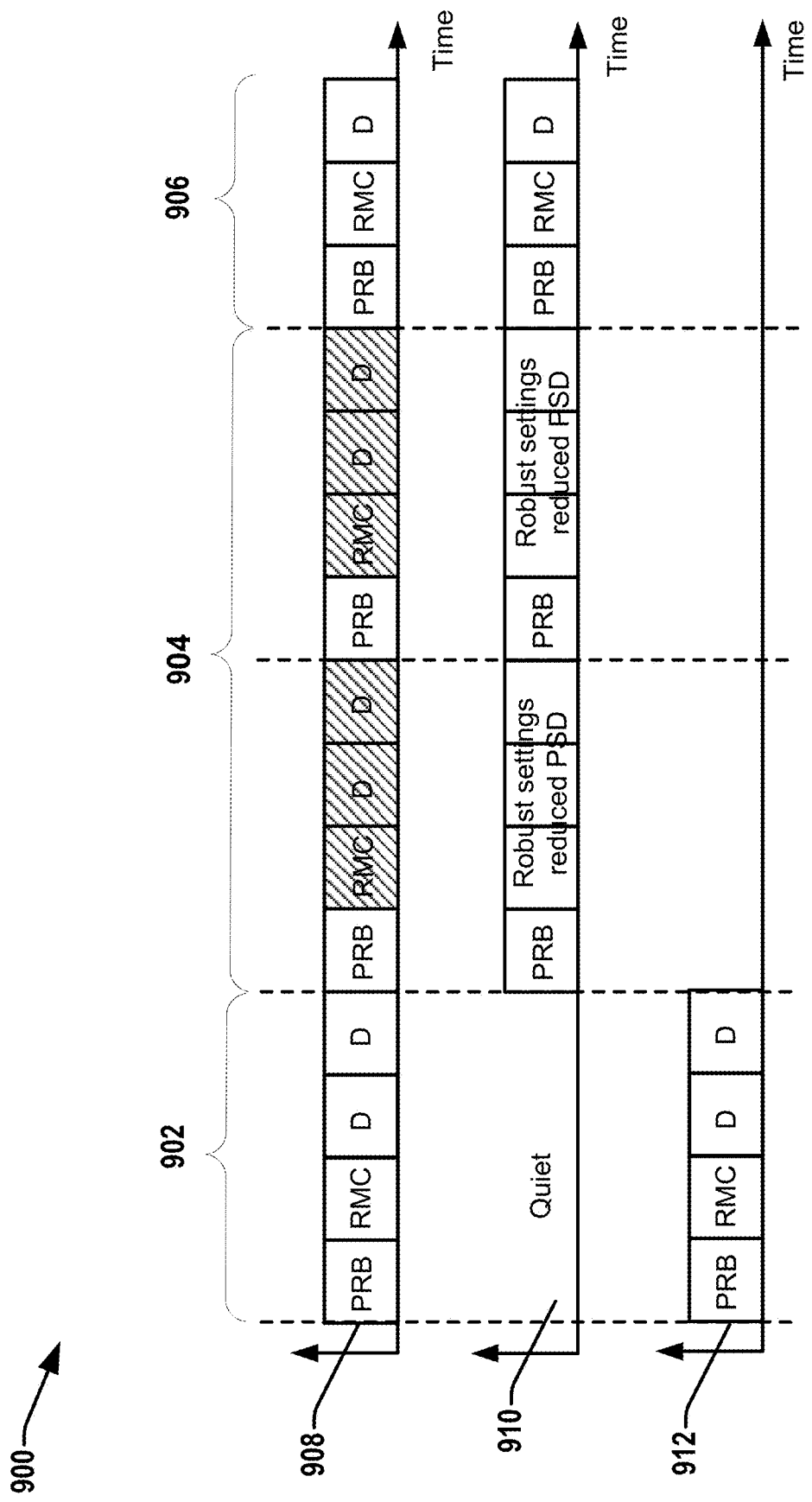
FIG. 9 is another block diagram of probe and data symbols along lines during re-distribution on granted tones in accordance with various aspects described.

In a third example embodiment, as further described infra with respect to FIG. 9, a deferred channel estimation can be a part of the bandwidth re-allocation so that channel estimation is deferred to after bandwidth is reallocated. This substantially shortens the channel estimation or re-allocation procedure since the line is used as usual from a time that is right after tones are re-allocated to the beneficiary CPEs 140, 150, for example. However, some or even all lines may need to apply reduced bit loading (due to high residual crosstalk expected) on the granted tones until crosstalk will be finally re-estimated and performance brought back to normal.

Figure 6:
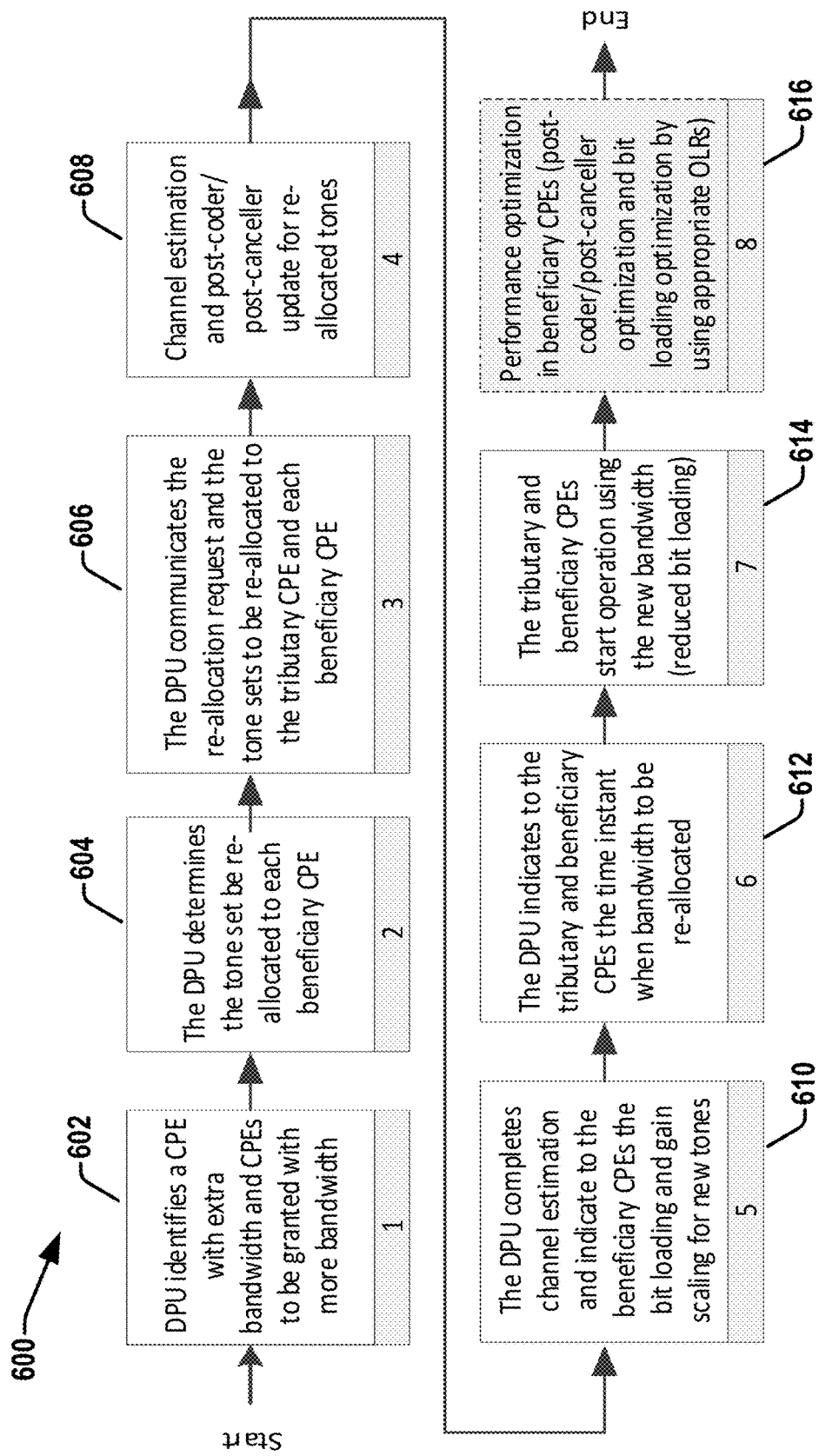
FIG. 6 is another example diagram illustrating a bandwidth re-distribution procedure according to various aspects described.

Referring to FIG. 6, illustrated is an example of an upstream bandwidth re-distribution process 600 according to the first example embodiment described above with respect to FIG. 5, for example.

At 602, bandwidth re-distribution initiates with the DPU 110 after the DPU detects (with assistance of the CPEs or without it) that one of the CPEs (e.g., 160) (CPE-n) has excessive upstream bandwidth relative to its current need/demand/use while one or more other CPEs 140, 150 can benefit from more upstream bandwidth, or the excess bandwidth allocated or assigned to CPE 160. As stated above, sometimes the CPE 140,150, 160 can predict the required upstream data rate in advance. For example, the CPE 140 can inform the DPU 110 on the required increase of an upstream data rate, while CPE 160 reports excessive data rate accordingly, so that appropriate upstream data rate is available at the time when it is requested.

At 604, the DPU 110 can select or determine one or more of CPEs 140 (CPE-k, CPE-m) to be granted additional upstream bandwidth by re-allocation of parts of the upstream bandwidth from CPE-n 160. The DPU 110 can identify the set of tones to be re-assigned from the tributary CPE-n 160 to each of the beneficiary CPEs 140 by using channel estimation (usually, direct channel estimation, as described above). This decision of the DPU 110 can comprise a prediction, since no crosstalk channel estimation is necessarily available at this time or stage.

At 606, the DPU 110 communicates the bandwidth re-allocation request and the selected set of re-assigned tones to the tributary CPE 160 (CPE-n) and to the beneficiary CPEs (CPE-k, CPE-m) 140 via one or more management channel(s).

At 608, the beneficiary CPEs 140 can start crosstalk channel estimation on granted tones by including them into probe symbols and modulating by probe sequences. No power is transmitted on granted tones during other symbol periods of beneficiary CPEs to avoid residual FEXT in other lines of the access line 122. The tributary CPE (CPE-n) 160 sends zero power on the granted tones in the probe symbols, but continues normal data transmission on these tones during all other symbols or is quiet optionally, as further illustrated at FIG. 5.

At 610, the DPU 110 can complete channel estimation and indicate to the beneficiary CPEs 140 the assigned bit loading and gain scaling for the newly assigned tones. During the channel estimation time, a vector channel estimator (VCE) of the DPU 110 can compute the new channel matrix that cancels crosstalk between the lines on the granted tones of the beneficiary CPEs 140. As the matrix is computed, the DPU 110 indicates to the beneficiary CPEs that granted tones can be turned on in all transmitted symbols, and what bit loading and gain settings for the granted tones to be used.

At 612, the DPU 110 also indicates to the tributary CPE 160 and to all beneficiary CPEs 140 the time instant at which the granted tones should be switched from the tributary CPE 160 to the beneficiary CPEs 140 for data transmission, i.e. the tributary CPE 160 will stop transmitting on granted tones, and the DPU 110 will continue receiving data on the granted tones.

At 614, from the time instant provided by the DPU 110, the data from the beneficiary CPEs 140 will be received instead of the tributary CPE 160. An indication of the time instant can be provided by the DPU 110 by sending the frame count, superframe count, or any other relevant time count that is synchronized between the MTU-O 174 and MTU-Rs 142, 152, 162. This count can be provided over the most robust of the management channels as determined by the DPU 110 or other component, for example, based on a signal or channel quality or signal power (e.g., an SNR, or the like).

At 616, a performance optimization can be performed in the beneficiary CPEs 140, which can be done by a precoder optimization via a precoder 170 and a bit loading optimization operation by using appropriate on-line reconfigurations (OLRs). After bandwidth is granted (the DPU 110 starts to receive data from the beneficiary CPEs), the DPU 110 receiver may improve performance in the new assigned bandwidth or in overall bandwidth using regular means of on-line reconfiguration (OLR). It is expected that VCE may shorten the channel estimation process by ending it after crosstalk from beneficiary CPEs is substantially cancelled in other lines of other CPEs 150, but not vice versa, which can enhance performance improvement in the upstream; the alternative could be to run a longer channel estimation, which slows down bandwidth re-distribution.

Figure 7:
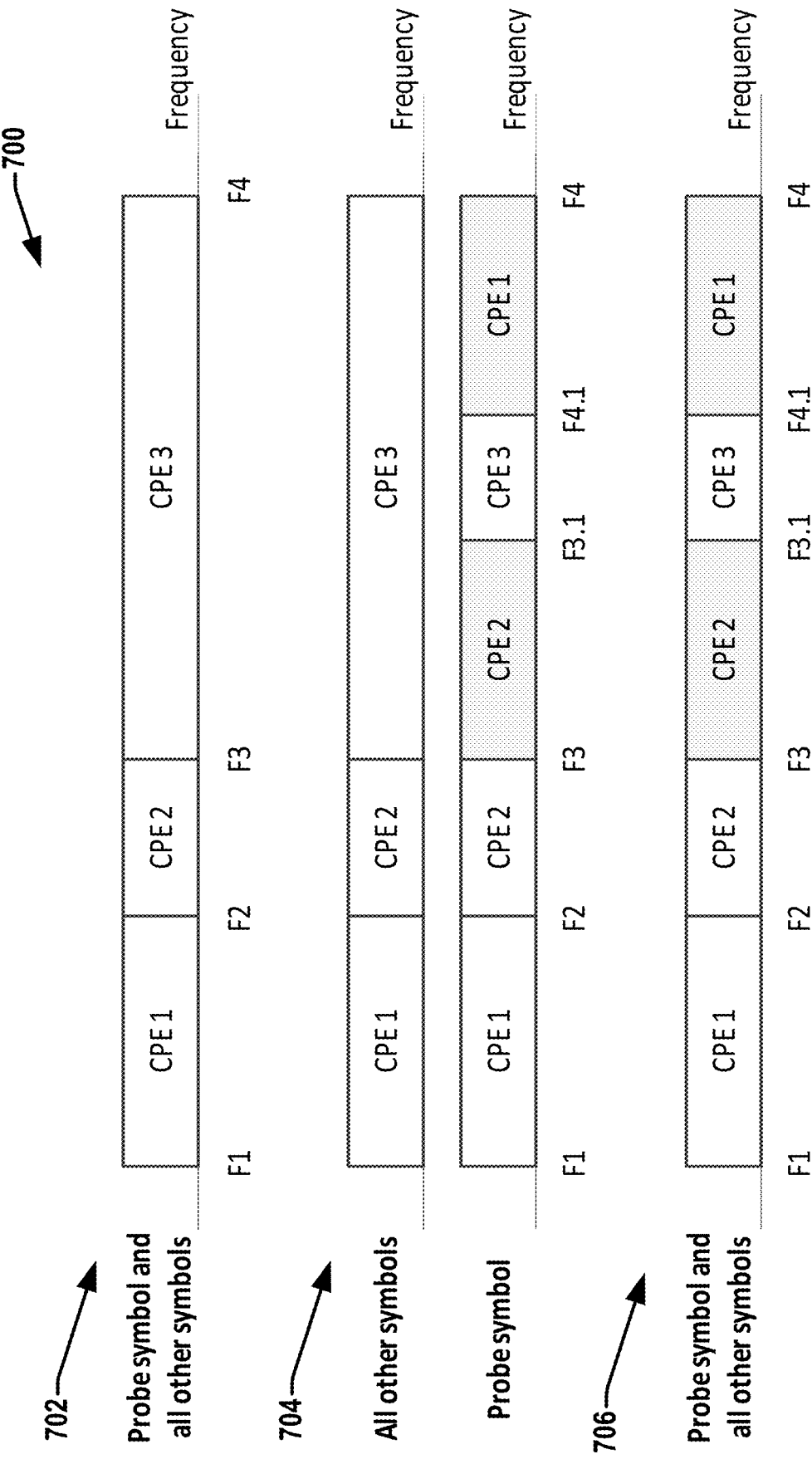
FIG. 7 is a block diagram of a frequency spectrum transformation during upstream bandwidth re-distribution according to various aspects described.

Referring to FIG. 7, illustrated is an example of a frequency spectrum transformation during an upstream bandwidth re-distribution 700 in accordance with various embodiments. To perform upstream channel estimation, the granted tones are first switched on or activated in probe symbols only, and then subsequently in all other symbols of the beneficiary CPEs 140. The order of switching initiating at a first time of communication 702, to a second time of communication 704, and ending with a third time of communications 706 is illustrated with the upstream bandwidth re-distribution 700 as an example of three CPEs—one tributary (CPE 3) and two beneficiary CPEs (CPE 1 and CPE 2). In some embodiments, pre-estimation of upstream crosstalk channel can be done beforehand, by measuring all cases of every upstream tone usage by every CPE. This can be possible by applying appropriate upstream probe sequences. If used, the MTU-O receiver can immediately switch its post-coder to precomputed values. However, this requires storage of channel matrixes for all combinations of all tones per all CPEs, which is often impractical.

In an aspect, during the channel estimation at 608 of FIG. 6, and following the actions at 610-614 in FIG. 6, probe symbols can be switched to the new (granted) or re-allocated tone set while data symbols keep or maintain the old tone set at second time of communication 704; thus, probe and data symbols can use different tone sets at this phase of re-allocation/re-distribution. After channel bandwidth re-allocation is complete at 616, the tone sets in probe symbols and in data symbols are again normalized with PRB, RMC and D symbols in the newly allocated tones at the third time of communications 706.

Referring to FIG. 8, illustrated is an example of communications 500 including probe and data and RMC symbol assignment for an accelerated channel estimation during a re-allocation/re-distribution being performed on granted tones in accordance with embodiments. In this example, communications 812 correspond to the tributary CPE 160, for example. Communications 810 correspond to a beneficiary CPE (e.g., 140) and communication symbols 808 correspond to another CPE 150 at a line, each with a different associated direct line of the access line 122 than other CPEs. Progression along the horizontal time line of the communications 800 illustrates different phases 802, 804, 806, and 807 of the re-distribution or re-allocation. These include an initial tone allocation 802, channel estimation on re-allocated tones 804 and equalizer training 806, and a new tone allocation with granted tones 807. Each block can represent a symbol as either a probe symbol or a data symbol. The accelerated channel estimation can be performed faster than the communication or channel estimation described in relation to FIG. 5 illustrated a case 1 or normal channel estimation time in relation.

In the first example embodiment, the communication processes 500 of FIG. 5, the time period to perform channel estimation may be too long because probe symbols can be sent only on their standard positions, which can be a limited number of symbol positions (sync symbols, in G.fast, G.mgfast, sent once in superframe). To speed up or accelerate the channel estimation for the granted tones, more symbol positions can be used for transmission of probe symbols, as shown in FIG. 8 and configured via the DPU 110, for example, as the second example embodiment. During these symbol positions in other lines use of re-allocated tones shall be limited to transmission of probe sequences or no transmission (quiet symbols), or data transmission in highly robust mode (low constellations). Transmission of probe sequences on all lines or transmission of probe sequences on the line that is subject of bandwidth re-distribution and quieting symbols on other lines of other CPEs 808 can provide optimal results for channel estimation.

Some symbols during the channel estimation at 608 in FIG. 6 can still be used for data transmission on the active lines, e.g., transmission of user data or transmission of a robust management channel (RMC). In those symbols re-allocated tones are not used, as shown in FIG. 8 at the beneficiary CPE 140 at the line of communication 810.

At 802, an initial bandwidth allocation is demonstrated as an example at each of the tributary CPE communications 812, beneficiary CPE communication activity 810, and the communications of other lines of other CPEs at 808. During the channel estimation period 804, the DPU 110 can collect and store the channel estimation information or compute a new channel matrix and equalizer coefficients at 806. After a channel estimation period is complete, some time period can be utilized or configured by the DPU 110 to prepare a crosstalk canceler component for the granted tones. During that time, the beneficiary CPEs do not transmit on the granted tones (as "quiet"), except in normal probe symbols, and other active lines may continue to use these tones for data transmission or be quiet. The instances of time at which the CPEs (both tributary at 812 and beneficiary at 810) transition into the channel estimation period 804, transition into computation of new equalizer 806, and finally transition to data transmission 807, are determined by the DPU 110 and communicated to all relevant CPEs (as at 612 in FIG. 6). At these instances of time, all relevant CPEs modify synchronously their associated transmission parameters.

When the computations of the new equalizer and upstream transmission settings at 806 on the changed tones are done, the DPU 110 indicates to the beneficiary CPEs (e.g., 140) the tone allocation and the bit loading that shall be used for data transmission (on granted tones, at least). A change of bit allocation and transmit PSD may be implemented for other lines 808, which can be performed synchronously with the time of activating of the granted tones.

Referring to FIG. 9, illustrated is another example of communications 900 including probe and data symbol assignment for a deferred channel estimation during a re-allocation/re-distribution in accordance with embodiments. As the third example embodiment, the communication processes 900 substantially shorten the channel estimation or re-allocation procedure since the line is used as usual from a time that is right after tones are re-allocated to the beneficiary CPEs 140, 150, for example. However, some or even all lines may need to apply reduced bit loading (due to high residual crosstalk expected) on the granted tones until crosstalk will be finally re-estimated and performance brought back to normal.

In this example, communications 912 correspond to the tributary CPE 160, for example. Communications 910 correspond to a beneficiary CPE (e.g., 140) and communications 909 correspond to another CPE 190, each with a different associated direct line of the access line 122 than other CPEs. Progression along the horizontal time lines of the communications 900 illustrates different phases 902, 904, 906 of the re-distribution or re-allocation. These include an initial tone allocation 902, channel estimation on re-allocated tones and equalizer training 904, and a new tone allocation with granted tones 906.

This example embodiment of communication processes 900 illustrates an embodiment that allows the DPU 110 to shorten the bandwidth re-distribution procedure and make it faster that the processes or communication operations 800 of FIG. 8 by skipping channel estimation before the bandwidth re-allocation, and performing it after, as a part of performance optimization at 616 of FIG. 6. In the embodiment of FIG. 9, the acts or processes at 608 of FIG. 6 are bypassed. Because there is no channel estimation during the re-distribution or re-allocation transition period before optimization on the granted tones, the upstream crosstalk on the granted tones can be high and only a very low bit loading (e.g., QPSK) can be supported in the communication processes 900. Therefore, beneficiary CPEs 140 at communication line 910 can use a robust transmission mode, which may be even predefined (e.g., use of QPSK on all granted tones). In this latter case, 610 in FIG. 6 can also be skipped. After switching to the new bandwidth at 908, full channel estimation and performance optimization can be used to recover higher upstream bit rates due to granted tones.

In an aspect, to reduce the impact of residual crosstalk from the granted tones on other lines 908, the transmit power of beneficiary CPEs 910 on granted tones can be reduced (by a predefined value, or by an updated gain scaling as at act 610 of FIG. 6). At the same time, the bit loading on granted tones in other lines 908 can also be reduced for the transition period 904, and then recovered after bandwidth is re-allocated at 906. Time wise, this ca happens at act 616 of FIG. 6, by joint performance optimization of the entire vectored group.

Figure 10:
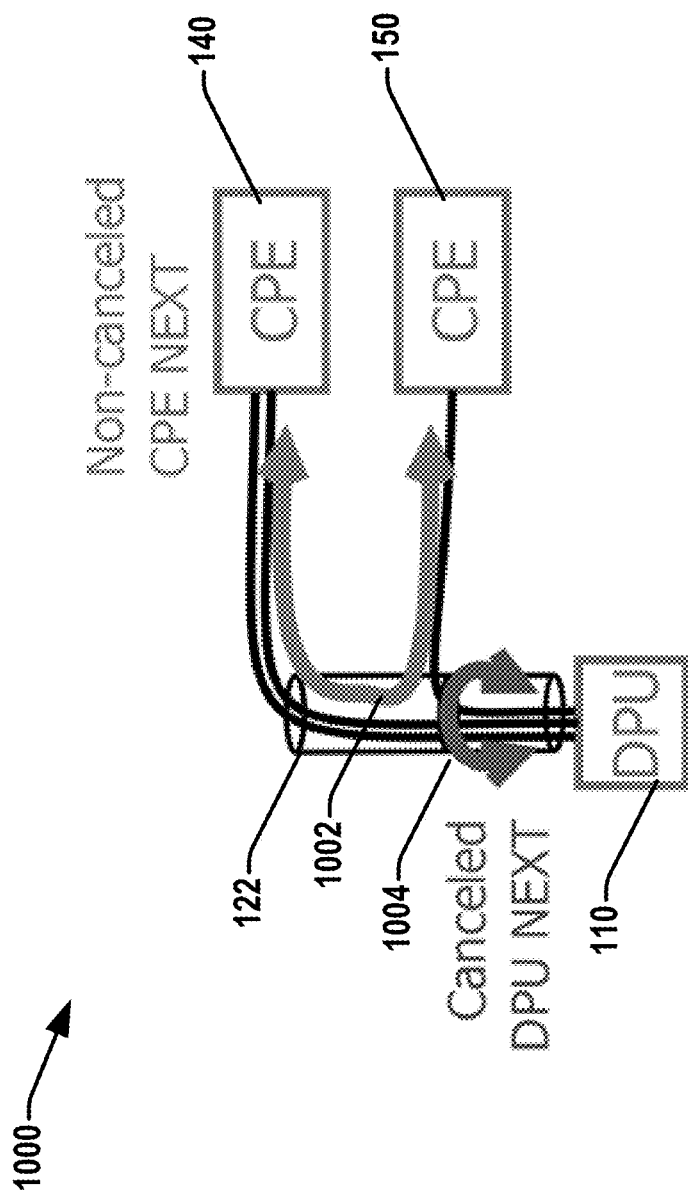
FIG. 10 is a block diagram of non-canceled NEXT between CPEs on different lines in accordance with various aspects described.

Referring to FIG. 10, illustrated is an example of a full-duplex bandwidth re-distribution system, 100. When full duplex transmission or partial echo cancellation transmission is used in a frequency division multiple access (FDMA) system such as in system 100, or the like, for example, upstream and downstream switching is not necessarily done independently, because the echo and NEXT canceler components of the DPU 110 have to be trained.

Additionally, or alternatively, the upstream transmission on granted tones can create a change in the crosstalk (e.g., in near end crosstalk (NEXT)) into the downstream direction of other lines (e.g., CPE 150 or lines 508, 808, or 908). While NEXT and echo 1004 can be canceled fully at the DPU 110 side, the NEXT between CPEs 140-160 1002 connected to different lines, e.g. one CPE 150 sends upstream and interferes with the reception of a CPE 140 connected to a different line, cannot be canceled. However, in an aspect, the DPU 110 can be configured to reduce the CPE NEXT 1002 by reducing the transmit power on re-allocated tones or by reducing the transmit time during which the NEXT from beneficiary CPE 140 is created.

Various other embodiments, can be utilized to perform the NEXT, FEXT, echo and direct channel estimation as identified for full duplex, three from which are similar to those defined for upstream (see above).

In one embodiment for full duplex bandwidth distribution, a normal channel estimation process can be utilized. With this method, standard probe symbols with loaded probe sequences are used. Upstream transmission on the granted tones is only started after the complete channel estimation is done, except for the probe symbols as illustrated in FIG. 5. During the upstream channel estimation period (e.g., 604), NEXT couplings from the granted tones are estimated and the corresponding information is transmitted to the DPU 110. The DPU 110 can update the downstream bit allocation on other lines for the granted tones according to the expected noise level change from the beneficiary CPEs (e.g., CPE 140) transmitting at these tones.

In another embodiment for full duplex bandwidth distribution, use of accelerated channel estimation processes can be utilized as illustrated in FIG. 8. Many (or possibly all available) data symbol positions can be used to carry probe sequences on the granted tones in the aim to reduce the required time of transmission. During the time of accelerated channel estimation, upstream and downstream transmission on the granted tones can be stopped, or only probe symbols be transmitted in the upstream and downstream direction. The CPE receivers 142-162 of all lines 122 can measure the level of NEXT from the beneficiary CPEs 140 on granted tones and adjust the downstream bit allocation accordingly. The DPU 110 can decide to lower the transmit PSD on the granted tones to reduce interference into other lines. All CPEs 150 of other lines can send a vectoring feedback report for the granted tones to the DPU 110, which may require a high data rate on the feedback channel. Additionally, or alternatively, only the receive PSD level observed on the granted tones during the training phase could be reported to the DPU 110 via the CPEs.

In yet another embodiment for full duplex bandwidth distribution, channel estimation methods can be employed after the bandwidth is reallocated. This entails to use the line subject to bandwidth re-distribution as usual after granted tones are re-allocated, but likely with a smaller number of loaded bits than before or otherwise. A reduction of the bit allocation on other lines on granted tones can be performed in both upstream and downstream direction.

Figure 11:
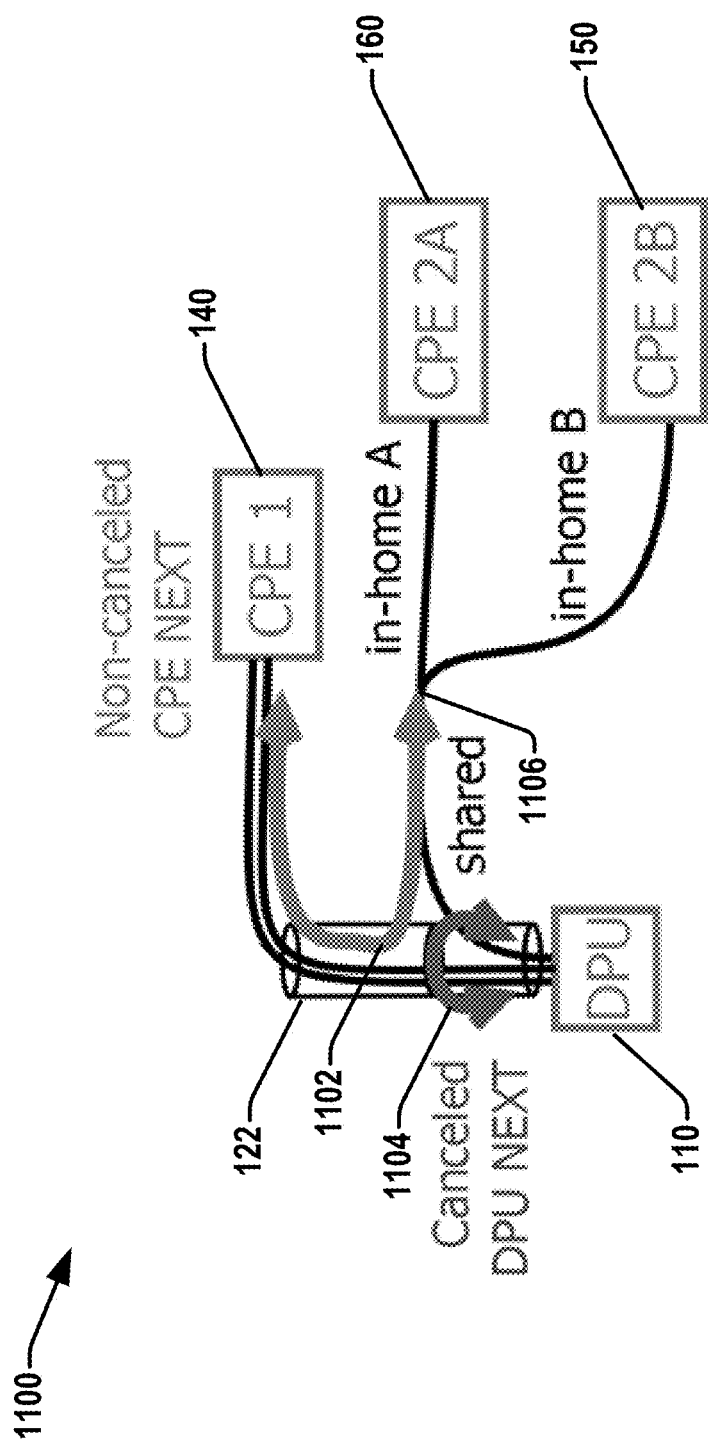
FIG. 11 is a block diagram of non-canceled NEXT between CPEs in the same premise served on the same line in accordance with various aspects described.

Referring to FIG. 11, illustrated is an example of non-canceled NEXT 1102 from different CPEs in a same premises that are served via a same line 1106 from the DPU 110, for example.

In yet even another embodiment for full duplex bandwidth distribution, a NEXT change prediction can be enabled or performed (e.g., via the DPU 110). The main issue in a full duplex system is the change of the non-canceled NEXT 1102 generated by the beneficiary CPE 140 into other lines of CPE 150 or 160 on the new granted tones, for example.

While the amplitude and phase of the NEXT coupling 1102 cannot be estimated accurately when changing between transmitting from the tributary CPE 2A 160 to a beneficiary CPE 2B 150, for example, the change in the NEXT power level experienced by a CPE 140 connected to other line (CPE) 122 of the binder or access line 122 can be estimated via the DPU 110.

If a number of tones are transferred from CPE 2A to CPE 2B in FIG. 11, the DPU 110 or other component can estimate the following, an upstream far-end cross talk (FEXT) on the re-allocated tones and NEXT between CPE2B 150 and CPE1 140 for the re-allocated, tones while it is assumed that NEXT 1104 at the DPU side and Downstream FEXT do not change or change are negligible.

The change of the NEXT coupling from CPE 2A (160)↔CPE1 (140) (or between CPE 2A (160) and CPE 1 (140)) to CPE 2B (150)↔CPE1 (140) can be approximated by the change of the direct channel attenuation from DPU 110↔CPE 2A (160) to DPU 110↔CPE 2B (150) (which addresses the difference in power of the upstream signal at the entrance into the cable binder 1106). Assume that the direct channel attenuation DPU 110↔CPE 2A (160) is known from earlier channel estimation and the direct channel DPU 110↔CPE 2B (150) is measured during downstream transmission to CPE 2B (150), the expected change of the NEXT level observed at CPE 1 (140) can be estimated based on the following representations:

$H_{DPU \to CPE2A}$ [dB]≈$H_{shared}$ [dB]+$H_{in\text{-}home\ A}$ [dB];
$H_{DPU \to CPE2B}$ [dB]≈$H_{shared}$ [dB]+$H_{in\text{-}home\ B}$ [dB];
$H_{CPE2B \to CPE1}$ [dB]≈$H_{CPE2A \to CPE1}$ [dB]−$H_{in\text{-}home\ A}$ [dB]+ $H_{in\text{-}home\ A}$ [dB]; $H_{CPE2B \to CPE1}$ [dB]≈$H_{CPE2A \to CPE1}$ [dB]− $H_{DPU \to CPE2A}$ [dB]+$H_{DPU \to CPE2B}$ [dB].

To adjust the upstream and downstream PSDs accordingly, the correction can be applied at DPU side on the stored NEXT channel estimation and the PSD optimization can be done with these new channel conditions, or the upstream transmit PSD from the beneficiary CPE (CPE 2B in FIG. 11) can be selected such that the crosstalk level remains approximately constant. Other similar types of adjustment can also be envisioned by the DPU 110.

Figure 12:
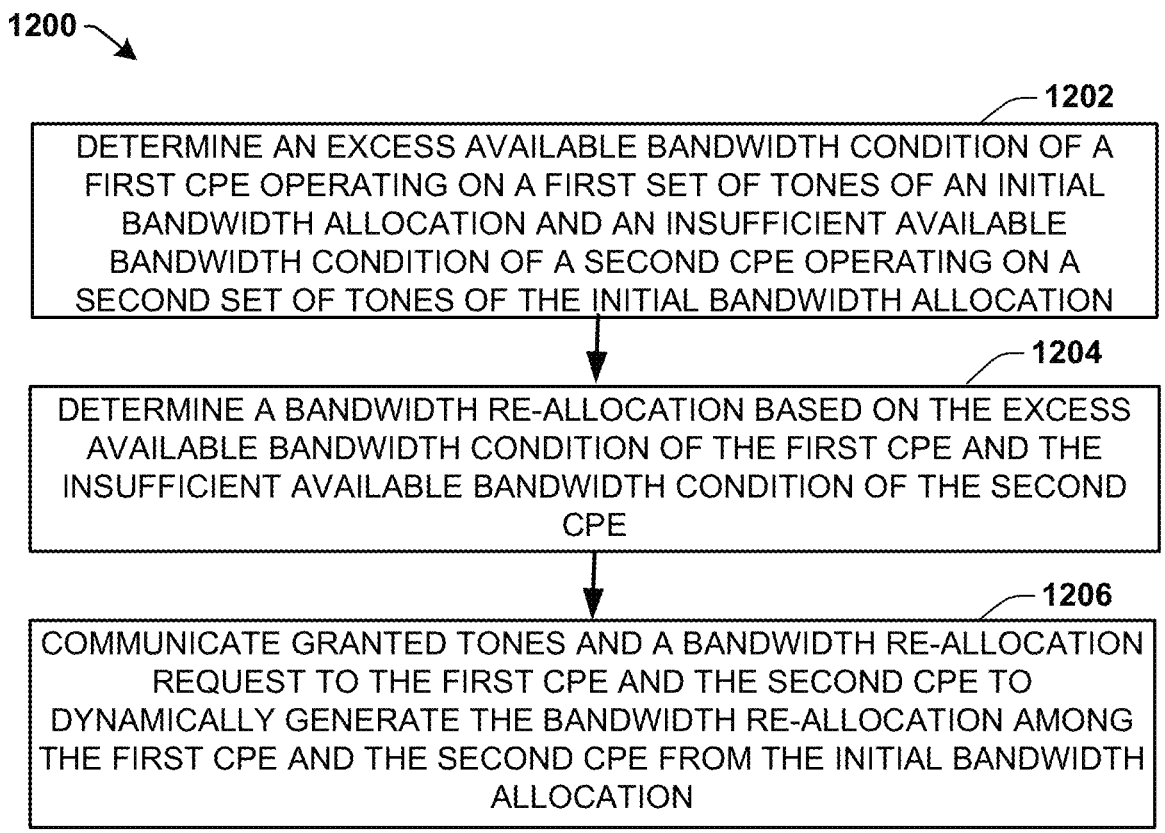
FIG. 12 is an example process flow for bandwidth re-distribution in accordance with various aspects described.

Referring to FIG. 12, illustrated is another example process flow 1200 for a DPU 110 device to redistribute bandwidth among CPEs (e.g., 140-160) coupled to the DPU 110 device via twisted pair (e.g., access line 122) with different lines to the CPEs, respectively, and operate in an initial bandwidth allocation.

At 1202, the DPU can determine, via a DPU processor coupled to the CPEs via a network interface device along the twisted pair, an excess available bandwidth condition of a first CPE operating on a first set of tones of an initial bandwidth allocation and an insufficient available bandwidth condition of a second CPE operating on a second set of tones of the initial bandwidth allocation.

At 1204, the process flow continues with determining, via the DPU processor, a bandwidth re-allocation based on the excess available bandwidth condition of the first CPE and the insufficient available bandwidth condition of the second CPE.

At 1206, the process flow continues with communicating, via the DPU processor coupled to the CPEs via the network interface device along the twisted pair, granted tones and a bandwidth re-allocation request to the first CPE and the second CPE to dynamically generate the bandwidth re-allocation among the first CPE and the second CPE from the initial bandwidth allocation.

The other aspects, the process flow 1200 can include communicating, via the DPU processor, a time instant at which the plurality of granted tones is switched from the first CPE to the second CPE. A channel pre-estimation can be performed by transmitting a probe signal comprising the granted tones, receiving one or more error indications from the CPEs based on the probe signal and computed error indications from the plurality of CPEs based on a crosstalk channel associated with the probe signals. The channel pre-estimation can be estimated based on the computed error indications, for example.

In other aspects, the process flow can include generating a downstream bandwidth re-distribution of downstream tones from the first set of tones and the second set of tones based on a first change in one or more criteria, the one or more criteria comprising: a computed error indication, a measured signal attenuation, the excess available bandwidth condition of the first CPE, the insufficient available bandwidth condition of the second CPE, or a downstream data rate of the first CPE or the second CPE; and generating, via the DPU processor, an upstream bandwidth re-distribution of upstream tones that is different from and independent of the upstream bandwidth re-distribution based on a second change in the one or more criteria further comprising an upstream data rate.

In one embodiment, in response to the bandwidth re-allocation comprising an upstream direction, the DPU can indicate a bit loading and a gain setting corresponding to a granted tone of the first set of tones being re-allocated from the first CPE to the second CPE.

The process flow can also comprise decreasing an amount of time for channel estimation during the bandwidth re-allocation at the second CPE by increasing a number of positions to transmit probe symbols that indicate the granted to the second CPE, while transmitting a quiet symbol or a probe symbol at the positions on another line to the first CPE or to other CPEs.

In response to the one or more CPEs operating in a full duplex communication mode, the DPU can estimate an upstream far-end crosstalk (FEXT) on the granted tones, estimate a near-end crosstalk (NEXT) between a third CPE of the plurality of CPEs, wherein NEXT for the third CPE is not canceled at the DPU device, based on a different between a first estimated NEXT between the first CPE and the third CPE before the bandwidth re-allocation and a second estimated NEXT between the second CPE and the third CPE after the bandwidth re-allocation, and adjust the upstream and downstream power spectral densities on second CPE lines to the one or more second CPEs based on an adjustment of a stored NEXT channel estimation that is a function of the estimated FEXT and the estimated NEXT.

Figure 13:
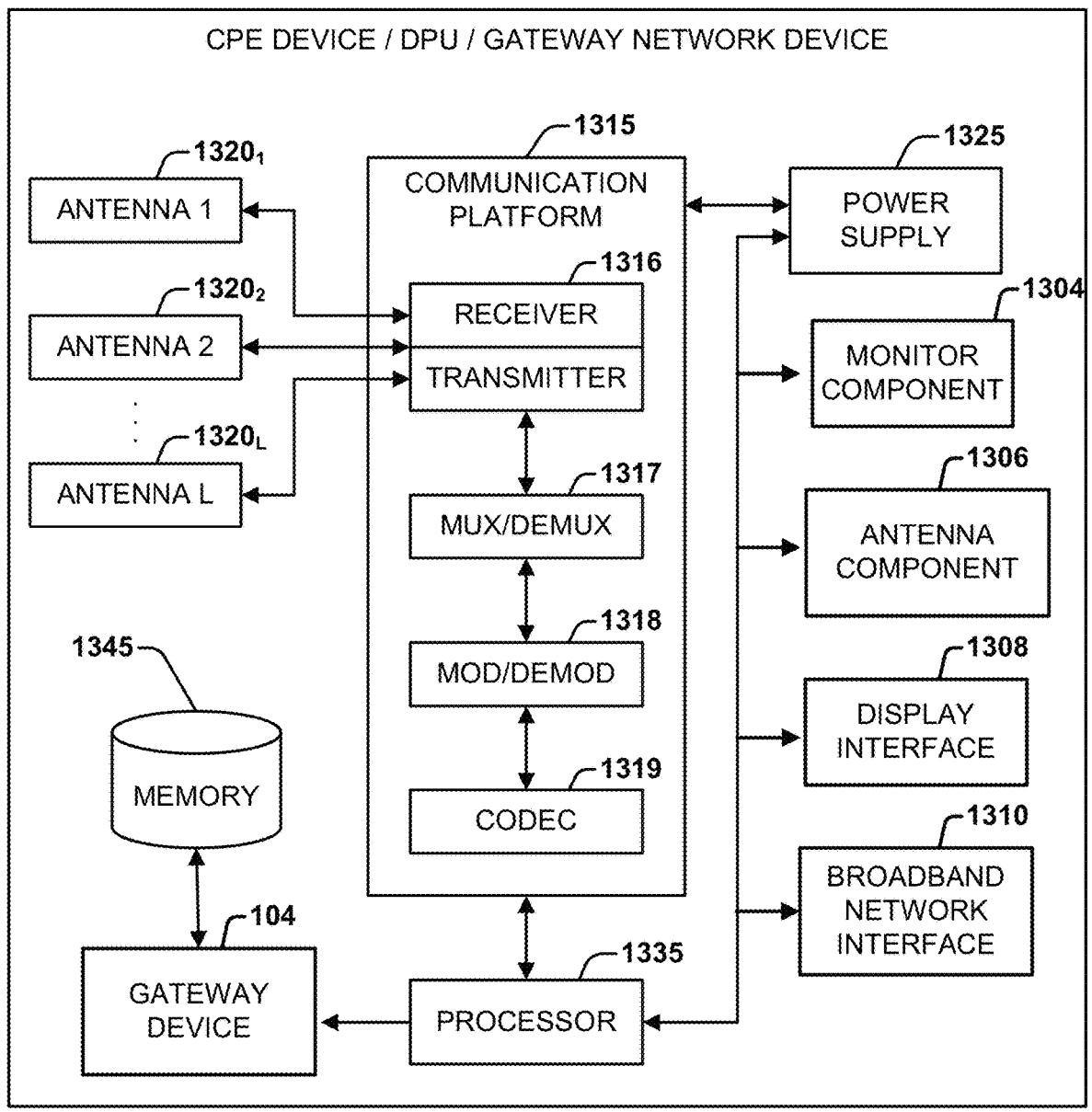
FIG. 13 is an exemplary wireless terminal, DPU, CPE, gateway device or user device for implementing various aspects described.

In order to provide further context for various aspects of the disclosed subject matter, FIG. 13 illustrates a non-limiting example of a computing device, such as a laptop, tablet, user equipment (e.g., mobile phone), user device, gateway network device (e.g., a device communicatively coupled to a home network with gateway device), the CPE 140, 150, 160, the DPU 110, or other communication device or wireless terminal 1300 that can implement some or all of the aspects/components described herein. In an aspect, wireless terminal, such as a laptop, tablet, other communication device, or wireless terminal 1300 can receive and transmit signal(s) to and/or from wireless devices such as APs, access terminals, wireless ports and routers, or the like, through a set of L antennas 1320, which can be configured according to one or more embodiments or aspects described herein. In one example, antennas 1320 can be implemented as part of a communication platform 1315, which in turn can comprise electronic components and associated circuitry and/or other means that provide for processing and manipulation of received signal(s) and signal(s) to be transmitted. The antennas 1320 can comprise the various antenna elements incorporating the different aspects or embodiments disclosed herein. In one example, the antennas 1320 can be located along an edge or side 1320 of the wireless terminal 1300, which can be within a same quadrant, section, portion or subset of the volume of the mobile device, opposing or different sections, for example.

In an aspect, communication platform 1315 can include a monitor component 1304 and antenna component 1306, which can couple to communication platform 1315 and include electronic components with associated circuitry that provide for processing and manipulation of received signal(s) and other signal(s) to be transmitted. The communication platform 1315 can further comprise a receiver/transmitter or transceiver 1316, which can transmit and receive signals and/or perform one or more processing operations on such signals (e.g., conversion from analog to digital upon reception, conversion from digital to analog upon transmission, etc.). In addition, transceiver 1316 can divide a single data stream into multiple, parallel data streams, or perform the reciprocal operation.

Additionally, the communication device 1300 can include display interface 1308, which can display functions that control functionality of the device 1300, or reveal operation conditions thereof. In addition, display interface 1308 can include a screen to convey information to an end user. In an aspect, display interface 1308 can be a liquid crystal display, a plasma panel, a monolithic thin-film based electro chromic display, and so on. Moreover, display interface 1308 can include a component (e.g., speaker) that facilitates communication of aural indicia, which can also be employed in connection with messages that convey operational instructions to an end user. Display interface 1308 can also facilitate data entry (e.g., through a linked keypad or through touch gestures), which can cause access equipment and/or software 1300 to receive external commands (e.g., restart operation).

Broadband network interface 1320 facilitates connection of access equipment and/or software 1300 to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 1310 can be internal or external to access equipment and/or software 1300, and can utilize display interface 1308 for end-user interaction and status information delivery.

Processor 1335 can be functionally connected to communication platform 1308 (as the DPU 110) and can facilitate operations on data (e.g., symbols, bits, or chips) for multiplexing/de-multiplexing, such as effecting direct and inverse fast Fourier transforms, selection of modulation rates, selection of data packet formats, inter-packet times, and so on. Moreover, processor 1335 can be functionally connected, through data, system, or an address bus, to display interface 1308 and broadband network interface 1310, to confer, at least in part, functionality to each of such components.

In another example, a multiplexer/de-multiplexer (mux/demux) unit 1317 can be coupled to transceiver 1316. Mux/demux unit 1317 can, for example, facilitate manipulation of signal in time and frequency space. Additionally or alternatively, mux/demux unit 1317 can multiplex information (e.g., data/traffic, control/signaling, etc.) according to various multiplexing schemes such as time division multiplexing (TDM), frequency division multiplexing (FDM), orthogonal frequency division multiplexing (OFDM), code division multiplexing (CDM), space division multiplexing (SDM), or the like. In addition, mux/demux unit 1317 can scramble and spread information according to substantially any code generally known in the art, such as Hadamard-Walsh codes, Baker codes, Kasami codes, polyphase codes, and so on.

In a further example, a modulator/demodulator (mod/demod) unit 13113 implemented within communication platform 1315 can modulate information according to multiple modulation techniques, such as frequency modulation, amplitude modulation (e.g., L-ary quadrature amplitude modulation (L-QAM), etc.), phase-shift keying (PSK), and the like. Further, communication platform 1315 can also include a coder/decoder (codec) module 1319 that facilitates decoding received signal(s) and/or coding signal(s) to convey.

According to another aspect, wireless terminal 1300 can include a processor 1335 configured to confer functionality, at least in part, to substantially any electronic component utilized by wireless terminal 1300. As further shown in system 1300, a power supply 1325 can attach to a power grid and include one or more transformers to achieve a power level at which various components and/or circuitry associated with wireless terminal 1300 can operate. In one example, power supply 1325 can include a rechargeable power mechanism to facilitate continued operation of wireless terminal 1300 in the event that wireless terminal 1300 is disconnected from the power grid, the power grid is not operating, etc. The antennas, for example, with the other antenna element configurations can further facilitate communications with a wireless charging of the power supply 1325, such as with a transfer of energy from the antenna system to the power supply 1325 via an oscillating magnetic field, for example.

In a further aspect, processor 1335 can be functionally connected to communication platform 1315 and can facilitate various operations on data (e.g., symbols, bits, chips, etc.), which can include, but are not limited to, effecting direct and inverse fast Fourier transforms, selection of modulation rates, selection of data packet formats, inter-packet times, etc. In another example, processor 1335 can be functionally connected, via a data or system bus (e.g., a wireless PCIE or the like), to any other components or circuitry not shown in system 1300 to at least partially confer functionality to each of such components, such as by the antenna systems disclosed herein.

As additionally illustrated, a memory 1345 can be used by wireless terminal 1300 to store data structures, code instructions and program modules, system or device information, code sequences for scrambling, spreading and pilot transmission, location intelligence storage, determined delay offset(s), over-the-air propagation models, and so on. Processor 1335 can be coupled to the memory 1345 in order to store and retrieve information necessary to operate and/or confer functionality to communication platform 1315 and/or any other components of wireless terminal 1300.

Further, the antenna systems described above with the communication device 1300 can also be configured, for example, to operate at a wide range of frequencies in a high band frequency range additionally include peer-to-peer (e.g., mobile-to-mobile) ad hoc network systems often using unpaired unlicensed spectrums, 1302.xx wireless LAN, BLUETOOTH and any other short- or long-range, wireless frequency ranges and communication techniques. The narrow band antenna elements disclosed herein, such as antennas resonating systems of devices disclosed, for example, can also be configured to operate at other frequency ranges also.

In other examples, the components disclosed in other figures can operate to communicate wirelessly with other components, such as the display interface 1308 as a wireless device, or with other wireless interfaces, such as a wireless USB device, for example. For example, a wireless USB device can communicate within a 3.1 to a 6.6 GHz frequency range. In addition, the antenna systems disclosed can be configured to communicate with other wireless connections, components, interfaces or devices in order to provide communication interfacing for wireless component-to-component communications. For example, a PCB to PCB interface can be facilitated by the high band antenna systems as well as micro millimeter wave communications among one or more internal or external components. Other communication interfaces can also be facilitated by the antenna elements disclosed such as an internet of things (IoT) to IoT components, wearable components, mobile to mobile, a network base station (e.g., a macro cell network device, femto cell device, pico cell device or other network devices) or any combination thereof to communicate via one of more of the antenna elements, such as via the antenna system or devices herein, for example. Additional other examples are also envisioned by which the antenna systems disclosed herein can operate in different frequency ranges, as well as communication and facilitate communications with, or among, one or more wireless components or devices. For example, industrial, scientific and medical (ISM) radio bands, radar band widths, or other ranges of a frequency spectrum can also be facilitated for communications by the antenna systems being disclosed.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Other examples of the various aspects/embodiments herein can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

In a first set of examples, a system for redistributing bandwidth among a plurality of CPEs that are configured to operate in an initial bandwidth allocation can comprise a first CPE of the plurality of CPEs configured to operate in a first initial set of tones based on the initial bandwidth allocation; a second CPE of the plurality of CPEs configured to operate in a second initial set of tones based on the initial bandwidth allocation; a distribution point unit (DPU), coupled to the first CPE and the second CPE via a single or multiple lines, respectively, as a point to multi-point access, wherein the DPU is configured to: determine an excess available bandwidth condition of the first CPE; determine an insufficient available bandwidth condition of the second CPE; determine a bandwidth re-allocation based on the excess available bandwidth condition of the first CPE and the insufficient available bandwidth condition of the second CPE; and communicate, to the first CPE and the second CPE, a bandwidth allocation request and a plurality of granted tones to dynamically generate the bandwidth re-allocation among the first CPE and the second CPE from the initial bandwidth allocation.

In an example of the first set of examples, the DPU is further configured to: communicate a time instant at which the plurality of granted tones is switched from the first CPE to the second CPE.

In another example of the first set of examples, the DPU is further configured to: perform a channel pre-estimation by transmitting a probe signal that comprises tones utilized by the plurality of CPEs; enable the plurality of CPEs to compute one or more error signals based on the probe signal; and receive the computed one or more error signals from the plurality of CPEs on received signals on direct channels associated with the plurality of CPEs, respectively, and one or more error signals from a crosstalk channel associated with the received signals.

In another example of the first set of examples, wherein the DPU is further configured to: determine the plurality of granted tones for the bandwidth re-allocation based on computed indications from the plurality of CPEs.

In another example of the first set of examples, the second CPE is further configured to compute bit loadings on tones re-allocated from the first CPE in response to the bandwidth re-allocation request and the plurality of granted tones, wherein the insufficient bandwidth condition is based on a downstream data rate corresponding to a service request.

In another example of the first set of examples, in response to the bandwidth re-allocation comprises a downstream direction, the first CPE is further configured to synchronize operation on first granted tone of the plurality of granted tones, and the second CPE is further configured to synchronize operation on second granted tone of the plurality of granted tones, and wherein the second CPE is further configured to perform an on-line reconfiguration (OLR) to optimize a precoding and a bit loading operation.

In another example of the first set of examples, the second CPE is further configured to mitigate near-end cross talk (NEXT) in response to communicating in a partial duplex operation from one or more other lines connected to another CPE of the plurality CPEs in the twisted pair or the cable line, and cancel echo on granted tones in response to communicating in a full duplex operation.

In another example of the first set of examples, the DPU is further configured to: generate a downstream bandwidth re-distribution of downstream tones from the first initial set of tones and the second initial set of tones based on a first change in one or more criteria, the one or more criteria comprising: a computed error indication, a measured signal attenuation, the excess available bandwidth condition of the first CPE, the insufficient available bandwidth condition of the second CPE, or a downstream data rate of the first CPE or the second CPE; and generate an upstream bandwidth re-distribution of upstream tones that is different from and independent of the downstream bandwidth re-distribution based on a second change in the one or more criteria further comprising an upstream data rate.

In another example of the first set of examples, in response to the bandwidth re-allocation comprising an upstream direction, the DPU is further configured to indicate a bit loading and a gain setting corresponding to a granted tone of the plurality of granted tones being re-allocated from the first CPE to the second CPE.

In another example of the first set of examples, the DPU is further configured to: decrease an amount of time for channel estimation during the bandwidth re-allocation at the second CPE by increasing a number of positions to transmit probe symbols that indicate the plurality of granted tones being utilized by the plurality of CPEs in a line of the twisted pair or cable line to the second CPE, while transmitting a quiet symbol or a probe symbol at the positions on another line of the twisted pair or cable line to the first CPE or to other CPEs.

In another example of the first set of examples, wherein the DPU is further configured to: decrease an amount of time for channel estimation during the bandwidth re-allocation by performing the channel estimation and a precoder update for the plurality of granted tones after the bandwidth re-allocation is completed with the first CPE and the second CPE.

In a second set of examples, an apparatus employed in a Distribution Point Unit (DPU) device can comprise a DPU processor comprising a memory and coupled to a plurality of customer premise equipments (CPEs) via a point-to-multi-point connection that operate on an initial frequency allocation, respectively; and a data interface as a point to multi-point access including an external port configured to connect the DPU processor via lines to the plurality of CPEs at a same premises and configured to communicate data corresponding to a frequency re-allocation from a first CPE of the plurality of CPEs to one or more second CPEs of the plurality of CPEs; wherein the DPU processor is configured to: determine available bandwidth from among the plurality of CPEs; generate an estimation of whether an additional bandwidth is anticipated by the second CPE; and in response to the available bandwidth and the estimation, generating the frequency re-allocation dynamically from the first CPE to the one or more second CPEs by communicating granted tones that differ from the initial frequency allocation to the plurality of CPEs and communicating a bandwidth re-allocation request that instructs the first CPE to relinquish the available bandwidth and the one or more second CPEs to operate on the available bandwidth of the first CPE with the granted tones based on the frequency re-allocation.

In an example of the second set of examples, the re-assignment of granted tones comprises a subset of carrier frequencies of the initial frequency allocation that the first CPE operated on, an indication to the first CPE to no longer operate on the subset of carrier frequencies, and another indication of an assignment to the one or more second CPEs to begin operating on the subset of carrier frequencies.

In another example of the second set of examples, the DPU processor is further configured to provide a time instant to the first CPE and the one or more second CPEs that triggers the frequency re-allocation communicating a frame count, a superframe count, or another time count that is synchronized between one or more DPU receivers of the DPU device and receivers of the plurality of CPEs in a synchronization operation.

In another example of the second set of examples, the DPU processor is further configured to: modify a power spectral density of the granted tones to control the synchronization operation of the one or more second CPEs before a completion of the frequency re-allocation by computing a channel matrix that cancels crosstalk between the lines on the granted tones to the one or more second CPEs and providing via the time instant an indication of a first time for the one or more second CPEs to receives one or more probe symbols on the granted tones while the first CPE receives one or more data symbols on the granted tones, and a second time that is different from the first time that the one or more CPEs receive both the one or more probe symbols and the one or more data symbols on the granted tones.

In another example of the second set of examples, the DPU processor is further configured to: receive one or more bit loadings from the one or more second CPEs on the granted tones re-allocated from the first CPE, in response to the frequency re-allocation corresponding to a downstream operation; and provide the one or more bit loadings to the one or more second CPEs, in response to the frequency re-allocation corresponding to an upstream operation.

In another example of the second set of examples, the DPU processor is further configured to: decrease an amount of power on lines of the one or more second CPEs during a transition time to reduce a bit loading on the lines of the one or more second CPEs, and then restoring the amount of power on the lines of the one or more second CPEs after the frequency re-allocation is completed.

In another example of the second set of examples, the DPU processor is further configured to: in response to the one or more CPEs operating in a full duplex communication mode: enable a transmission of probe symbols only on the granted tones in the upstream direction during the frequency re-allocation and transmission of both data symbols and probe symbols on the granted tones after the frequency re-allocation; or enable the transmission of problem symbols on one or more data symbol positions during a reduced channel estimation or a transition period during the frequency re-allocation when transmission is stopped or only the transmission of probe symbols is enabled in the full duplex communication mode.

In another example of the second set of examples, the DPU processor is further configured to: in response to the one or more CPEs operating in a full duplex communication mode: estimate an upstream far-end crosstalk (FEXT) on the granted tones; estimate a near-end crosstalk (NEXT) between a third CPE of the plurality of CPEs, wherein NEXT for the third CPE is not canceled at the DPU device, based on a different between a first estimated NEXT between the first CPE and the third CPE before the frequency re-allocation and a second estimated NEXT between the second CPE and the third CPE after the frequency re-allocation; and adjust upstream and downstream power spectral densities on second CPE lines to the one or more second CPEs based on an adjustment of a stored NEXT channel estimation from the estimated FEXT and the estimated NEXT.

In a third set of examples, a method for a distribution point unit (DPU) device to redistribute bandwidth among customer premises equipments (CPEs) coupled to the DPU device via twisted pair with different lines to the CPEs, respectively, and operating in an initial bandwidth allocation, can comprise: determining, via a DPU processor coupled to the CPEs via a network interface as a point to multi-point access interface, an excess available bandwidth condition of a first CPE operating on a first set of tones of an initial bandwidth allocation and an insufficient available bandwidth condition of a second CPE operating on a second set of tones of the initial bandwidth allocation; determining, via the DPU processor, a bandwidth re-allocation based on the excess available bandwidth condition of the first CPE and the insufficient available bandwidth condition of the second CPE; and communicating, via the DPU processor coupled to the CPEs via the network interface device along the twisted pair, granted tones and a bandwidth re-allocation request to the first CPE and the second CPE to dynamically generate the bandwidth re-allocation among the first CPE and the second CPE from the initial bandwidth allocation.

In an example of the third set of examples, the method can comprise: communicating, via the DPU processor, a time instant at which the plurality of granted tones is switched from the first CPE to the second CPE.

In another example of the third set of examples, the method can comprise: performing, via the DPU processor, a channel pre-estimation by transmitting a probe signal comprising the granted tones, receiving a report on signal to noise ratio or power strength from the CPEs based on the probe signal for a direct channel and computed error signals from the plurality of CPEs based on a crosstalk channel associated with the probe signals; and generating, via the DPU processor, the channel pre-estimation based on the computed error signals and the report.

In another example of the third set of examples, the method can comprise: generating, via the DPU processor, a downstream bandwidth re-distribution of downstream tones from the first set of tones and the second set of tones based on a first change in one or more criteria, the one or more criteria comprising: a computed indication, a measured signal attenuation, the excess available bandwidth condition of the first CPE, the insufficient available bandwidth condition of the second CPE, or a downstream data rate of the first CPE or the second CPE; and generating, via the DPU processor, an upstream bandwidth re-distribution of upstream tones that is different from and independent of the upstream bandwidth re-distribution based on a second change in the one or more criteria further comprising an upstream data rate.

In another example of the third set of examples, the method can comprise: in response to the bandwidth re-allocation comprising an upstream direction, indicating, via the DPU processor, a bit loading and a gain setting corresponding to a granted tone of the first set of tones being re-allocated from the first CPE to the second CPE.

In another example of the third set of examples, the method can comprise: decreasing, via the DPU processor, an amount of time for channel estimation during the bandwidth re-allocation at the second CPE by increasing a number of positions to transmit probe symbols that indicate the granted to the second CPE, while transmitting a quiet symbol or a probe symbol at the positions on another line to the first CPE or to other CPEs.

In another example of the third set of examples, the method can comprise: in response to the one or more CPEs operating in a full duplex communication mode: estimating an upstream far-end crosstalk (FEXT) on the granted tones; estimating a near-end crosstalk (NEXT) between a third CPE of the plurality of CPEs, wherein NEXT for the third CPE is not canceled at the DPU device, based on a different between a first estimated NEXT between the first CPE and the third CPE before the bandwidth re-allocation and a second estimated NEXT between the second CPE and the third CPE after the bandwidth re-allocation; and adjusting upstream and downstream power spectral densities on second CPE lines to the one or more second CPEs based on an adjustment of a stored NEXT channel estimation that is a function of the estimated FEXT and the estimated NEXT.

Examples can include an apparatus comprising means to perform one or more elements of a method described in or related to any of examples (embodiments) above, or any other method or process described herein.

Examples can include one or more non-transitory computer-readable media comprising instructions to cause an electronic device, upon execution of the instructions by one or more processors of the electronic device, to perform one or more elements of a method described in or related to any of examples above, or any other method or process described herein.

Examples can include an apparatus comprising logic, modules, or circuitry to perform one or more elements of a method described in or related to any of examples above, or any other method or process described herein.

Examples can include a method, technique, or process as described in or related to any of examples above, or portions or parts thereof.

Examples can include an apparatus comprising: one or more processors and one or more computer readable media comprising instructions that, when executed by the one or more processors, cause the one or more processors to perform the method, techniques, or process as described in or related to any of examples above, or portions thereof.

Examples can include a method of communicating in a wireless network as shown and described herein.

Examples can include a system for providing wireless communication as shown and described herein.

Examples can include a device for providing wireless communication as shown and described herein.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques. Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A system for redistributing bandwidth among a plurality of customer premises equipments (CPEs) that are configured to operate in an initial bandwidth allocation, the system comprising:
    a first CPE of the plurality of CPEs configured to operate in a first initial set of tones based on the initial bandwidth allocation;
    a second CPE of the plurality of CPEs configured to operate in a second initial set of tones based on the initial bandwidth allocation;
    a distribution point unit (DPU), coupled to the first CPE and the second CPE via a single or multiple lines, respectively, as a point to multi-point access wherein the DPU is configured to:
        determine an excess available bandwidth condition of the first CPE;
        determine an insufficient available bandwidth condition of the second CPE;
        determine a bandwidth re-allocation based on the excess available bandwidth condition of the first CPE and the insufficient available bandwidth condition of the second CPE; and
        communicate, to the first CPE and the second CPE, a bandwidth re-allocation request and a plurality of granted tones to dynamically generate the bandwidth re-allocation among the first CPE and the second CPE from the initial bandwidth allocation.

2. The system of claim 1, wherein the DPU is further configured to:
    communicate a time instant at which the plurality of granted tones is switched from the first CPE to the second CPE.

3. The system of claim 1, wherein the DPU is further configured to:
    perform a channel pre-estimation by transmitting a probe signal that comprises tones utilized by the plurality of CPEs;
    enable the plurality of CPEs to compute one or more error signals based on the probe signal; and
    receive the one or more error signals from the plurality of CPEs on received signals on direct channels associated with the plurality of CPEs, respectively, and one or more error signals from a crosstalk channel associated with the received signals.

4. The system of claim 1, wherein the DPU is further configured to:
    determine the plurality of granted tones for the bandwidth re-allocation based on computed indications from the plurality of CPEs.

5. The system of claim 1, wherein the second CPE is further configured to compute bit loadings on tones re-allocated from the first CPE in response to the bandwidth re-allocation request and the plurality of granted tones, wherein the insufficient bandwidth condition is based on a downstream data rate corresponding to a service request.

6. The system of claim 1, wherein, in response to the bandwidth re-allocation comprises a downstream direction, the first CPE is further configured to synchronize operation on first granted tone of the plurality of granted tones, and the second CPE is further configured to synchronize operation on second granted tone of the plurality of granted tones, and wherein the second CPE is further configured to perform an on-line reconfiguration (OLR) to optimize a precoding and a bit loading operation.

7. The system of claim 1, wherein the second CPE is further configured to mitigate near-end cross talk (NEXT) in response to communicating in a partial duplex operation from one or more other lines connected to another CPE of the plurality CPEs in a twisted pair or a cable line, and cancel echo on granted tones in response to communicating in a full duplex operation.

8. The system of claim 1, wherein the DPU is further configured to:
generate a downstream bandwidth re-distribution of downstream tones from the first initial set of tones and the second initial set of tones based on a first change in one or more criteria, the one or more criteria comprising: a computed error indication, a measured signal attenuation, the excess available bandwidth condition of the first CPE, the insufficient available bandwidth condition of the second CPE, or a downstream data rate of the first CPE or the second CPE; and
generate an upstream bandwidth re-distribution of upstream tones that is different from and independent of the downstream bandwidth re-distribution based on a second change in the one or more criteria further comprising an upstream data rate.

9. The system of claim 1, wherein, in response to the bandwidth re-allocation comprising an upstream direction, the DPU is further configured to indicate a bit loading and a gain setting corresponding to a granted tone of the plurality of granted tones being re-allocated from the first CPE to the second CPE.

10. The system of claim 1, wherein the DPU is further configured to:
decrease an amount of time for channel estimation during the bandwidth re-allocation at the second CPE by increasing a number of positions to transmit probe symbols that indicate the plurality of granted tones being utilized by the plurality of CPEs in a line of a twisted pair or a cable line to the second CPE, while transmitting a quiet symbol or a probe symbol at the positions on another line of the twisted pair or the cable line to the first CPE or to other CPEs.

11. The system of claim 1, wherein the DPU is further configured to:
decrease an amount of time for channel estimation during the bandwidth re-allocation by performing the channel estimation and a precoder update for the plurality of granted tones after the bandwidth re-allocation is completed with the first CPE and the second CPE.

12. An apparatus employed in a Distribution Point Unit (DPU) device comprising:
a DPU processor comprising a memory and coupled to a plurality of customer premise equipments (CPEs) via a point-to-multipoint connection that operate on an initial frequency allocation, respectively; and
a data interface as a point to multi-point access including an external port configured to connect the DPU processor via lines to the plurality of CPEs at a same premises and configured to communicate data corresponding to a frequency re-allocation from a first CPE of the plurality of CPEs to one or more second CPEs of the plurality of CPEs;
wherein the DPU processor is configured to:
determine available bandwidth from among the plurality of CPEs;
generate an estimation of whether an additional bandwidth is anticipated by the one or more second CPEs; and
in response to the available bandwidth and the estimation, generating the frequency re-allocation dynamically from the first CPE to the one or more second CPEs by communicating granted tones that differ from the initial frequency allocation to the plurality of CPEs and communicating a bandwidth re-allocation request that instructs the first CPE to relinquish the available bandwidth and the one or more second CPEs to operate on the available bandwidth of the first CPE with the granted tones based on the frequency re-allocation.

13. The apparatus of claim 12, wherein the frequency re-allocation comprises a subset of carrier frequencies of the initial frequency allocation that the first CPE operated on, an indication to the first CPE to no longer operate on the subset of carrier frequencies, and another indication of an assignment to the one or more second CPEs to begin operating on the subset of carrier frequencies.

14. The apparatus of claim 12, wherein the DPU processor is further configured to provide a time instant to the first CPE and the one or more second CPEs that triggers the frequency re-allocation communicating a frame count, a superframe count, or another time count that is synchronized between one or more DPU receivers of the DPU device and receivers of the plurality of CPEs in a synchronization operation.

15. The apparatus of claim 14, wherein the DPU processor is further configured to:
modify a power spectral density of the granted tones to control the synchronization operation of the one or more second CPEs before a completion of the frequency re-allocation by computing a channel matrix that cancels crosstalk between the lines on the granted tones to the one or more second CPEs and providing via the time instant an indication of a first time for the one or more second CPEs to receives one or more probe symbols on the granted tones while the first CPE receives one or more data symbols on the granted tones, and a second time that is different from the first time that the one or more second CPEs receive both the one or more probe symbols and the one or more data symbols on the granted tones.

16. The apparatus of claim 12, wherein the DPU processor is further configured to:
receive one or more bit loadings from the one or more second CPEs on the granted tones re-allocated from the first CPE, in response to the frequency re-allocation corresponding to a downstream operation; and
provide the one or more bit loadings to the one or more second CPEs, in response to the frequency re-allocation corresponding to an upstream operation.

17. The apparatus of claim 12, wherein the DPU processor is further configured to:
decrease an amount of power on lines of the one or more second CPEs during a transition time to reduce a bit loading on the lines of the one or more second CPEs, and then restoring the amount of power on the lines of the one or more second CPEs after the frequency re-allocation is completed.

18. The apparatus of claim 12, wherein the DPU processor is further configured to:
in response to one or more CPEs operating in a full duplex communication mode:
enable a transmission of probe symbols only on the granted tones in a upstream direction during the frequency re-allocation and transmission of both data symbols and probe symbols on the granted tones after the frequency re-allocation; or
enable the transmission of probe symbols on one or more data symbol positions during a reduced channel estimation or a transition period during the frequency re-allocation when transmission is stopped or only the transmission of probe symbols is enabled in the full duplex communication mode.

19. The apparatus of claim 12, wherein the DPU processor is further configured to:
in response to one or more CPEs operating in a full duplex communication mode:
estimate an upstream far-end crosstalk (FEXT) on the granted tones;
estimate a near-end crosstalk (NEXT) between a third CPE of the plurality of CPEs, wherein NEXT for the third CPE is not canceled at the DPU device, based on a difference between a first estimated NEXT between the first CPE and the third CPE before the frequency re-allocation and a second estimated NEXT between a second CPE and the third CPE after the frequency re-allocation; and
adjust upstream and downstream power spectral densities on second CPE lines to the one or more second CPEs based on an adjustment of a stored NEXT channel estimation from the estimated FEXT and the estimated NEXT.

20. A method for a distribution point unit (DPU) device to redistribute bandwidth among customer premises equipments (CPEs) coupled to the DPU device via twisted pair with different lines to the CPEs, respectively, and operating in an initial bandwidth allocation, the method comprising:
determining, via a DPU processor coupled to the CPEs via a network interface as a point to multi-point access interface, an excess available bandwidth condition of a first CPE operating on a first set of tones of an initial bandwidth allocation and an insufficient available bandwidth condition of a second CPE operating on a second set of tones of the initial bandwidth allocation;
determining, via the DPU processor, a bandwidth re-allocation based on the excess available bandwidth condition of the first CPE and the insufficient available bandwidth condition of the second CPE; and
communicating, via the DPU processor coupled to the CPEs via the network interface device along the twisted pair, granted tones and a bandwidth re-allocation request to the first CPE and the second CPE to dynamically generate the bandwidth re-allocation among the first CPE and the second CPE from the initial bandwidth allocation.

21. The method of claim 20, further comprising:
communicating, via the DPU processor, a time instant at which the granted tones are switched from the first CPE to the second CPE.

22. The method of claim 20, further comprising:
performing, via the DPU processor, a channel pre-estimation by transmitting a probe signal comprising the granted tones, receiving a report on signal to noise ratio or power strength from the CPEs based on the probe signal for a direct channel and computed error signals from the CPEs based on a crosstalk channel associated with the probe signals; and
generating, via the DPU processor, the channel pre-estimation based on the computed error signals and the report.

23. The method of claim 20, further comprising:
generating, via the DPU processor, a downstream bandwidth re-distribution of downstream tones from the first set of tones and the second set of tones based on a first change in one or more criteria, the one or more criteria comprising: a computed indication, a measured signal attenuation, the excess available bandwidth condition of the first CPE, the insufficient available bandwidth condition of the second CPE, or a downstream data rate of the first CPE or the second CPE; and
generating, via the DPU processor, an upstream bandwidth re-distribution of upstream tones that is different from and independent of an upstream bandwidth re-distribution based on a second change in the one or more criteria further comprising an upstream data rate.

24. The method of claim 20, further comprising:
in response to the bandwidth re-allocation comprising an upstream direction, indicating, via the DPU processor, a bit loading and a gain setting corresponding to a granted tone of the first set of tones being re-allocated from the first CPE to the second CPE.

25. The method of claim 20, further comprising:
decreasing, via the DPU processor, an amount of time for channel estimation during the bandwidth re-allocation at the second CPE by increasing a number of positions to transmit probe symbols that indicate the granted tones to the second CPE, while transmitting a quiet symbol or a probe symbol at the positions on another line to the first CPE or to other CPEs.

26. The method of claim 20, further comprising:
in response to one or more CPEs operating in a full duplex communication mode:
estimating an upstream far-end crosstalk (FEXT) on the granted tones;
estimating a near-end crosstalk (NEXT) between a third CPE of the CPEs, wherein NEXT for the third CPE is not canceled at the DPU device, based on a different between a first estimated NEXT between the first CPE and the third CPE before the bandwidth re-allocation and a second estimated NEXT between the second CPE and the third CPE after the bandwidth re-allocation; and
adjusting upstream and downstream power spectral densities on second CPE lines to the second CPE based on an adjustment of a stored NEXT channel estimation that is a function of the estimated FEXT and the estimated NEXT.

* * * * *